United States Patent
Yamano et al.

(10) Patent No.: US 10,514,763 B2
(45) Date of Patent: Dec. 24, 2019

(54) SYSTEM, TERMINAL APPARATUS, METHOD, AND RECORDING MEDIUM

(71) Applicant: SONY CORPORATION, Tokyo (JP)

(72) Inventors: Ikuo Yamano, Tokyo (JP); Yosuke Matsuzaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,933

(22) PCT Filed: Mar. 31, 2017

(86) PCT No.: PCT/JP2017/013804
§ 371 (c)(1),
(2) Date: Jul. 18, 2018

(87) PCT Pub. No.: WO2017/175689
PCT Pub. Date: Oct. 12, 2017

(65) Prior Publication Data
US 2019/0025924 A1    Jan. 24, 2019

Related U.S. Application Data

(60) Provisional application No. 62/319,412, filed on Apr. 7, 2016.

(51) Int. Cl.
*H04N 5/222* (2006.01)
*G06F 3/01* (2006.01)
(Continued)

(52) U.S. Cl.
CPC .............. *G06F 3/016* (2013.01); *G06F 1/163* (2013.01); *G06F 3/01* (2013.01); *G06F 3/011* (2013.01);
(Continued)

(58) Field of Classification Search
CPC . G06F 3/016; G06F 1/163; G06F 3/01; G06F 3/011; H04M 1/00; H04M 1/0202; H04M 11/00; H04M 11/08
See application file for complete search history.

(56) References Cited

U.S. PATENT DOCUMENTS

2004/0243324 A1* 12/2004 Nunokawa ............ G06F 1/1626
702/63
2005/0280545 A1* 12/2005 Ryou ...................... G06F 3/011
340/573.1
(Continued)

FOREIGN PATENT DOCUMENTS

JP          2005-303722 A          10/2005
JP          2005303722 A    *    10/2005
(Continued)

*Primary Examiner* — Munear T Akki
(74) *Attorney, Agent, or Firm* — Paratus Law Group, PLLC

(57) ABSTRACT

There is provided a system that enables rich communication using tactile simulation, the system including: a first terminal apparatus; and a plurality of second terminal apparatuses. The first terminal apparatus transmits first tactile information that has been generated by combining first sensor information related to a first user detected by sensors and indicates a state of the first user. The plurality of second terminal apparatuses receive and output the first tactile information.

19 Claims, 15 Drawing Sheets

(51) Int. Cl.
*H04M 1/00* (2006.01)
*H04M 11/00* (2006.01)
*G06F 1/16* (2006.01)
*H04M 1/02* (2006.01)
*H04M 11/08* (2006.01)

(52) U.S. Cl.
CPC ........... *H04M 1/00* (2013.01); *H04M 1/0202* (2013.01); *H04M 11/00* (2013.01); *H04M 11/08* (2013.01)

(56) References Cited

U.S. PATENT DOCUMENTS

| | | | |
|---|---|---|---|
| 2009/0132088 A1* | 5/2009 | Taitler | G05B 19/42 700/264 |
| 2010/0210323 A1* | 8/2010 | Collins | H04M 1/72547 455/575.1 |
| 2011/0169908 A1* | 7/2011 | Lee | G06F 3/016 348/14.02 |
| 2016/0196726 A1* | 7/2016 | Saito | H04M 1/72519 340/407.1 |

FOREIGN PATENT DOCUMENTS

| | | |
|---|---|---|
| JP | 2006-236253 A | 9/2006 |
| JP | 2009-015449 A | 1/2009 |
| WO | WO 2013/073437 A1 | 5/2013 |
| WO | WO 2015/029573 A1 | 3/2015 |

\* cited by examiner

FIG. 1
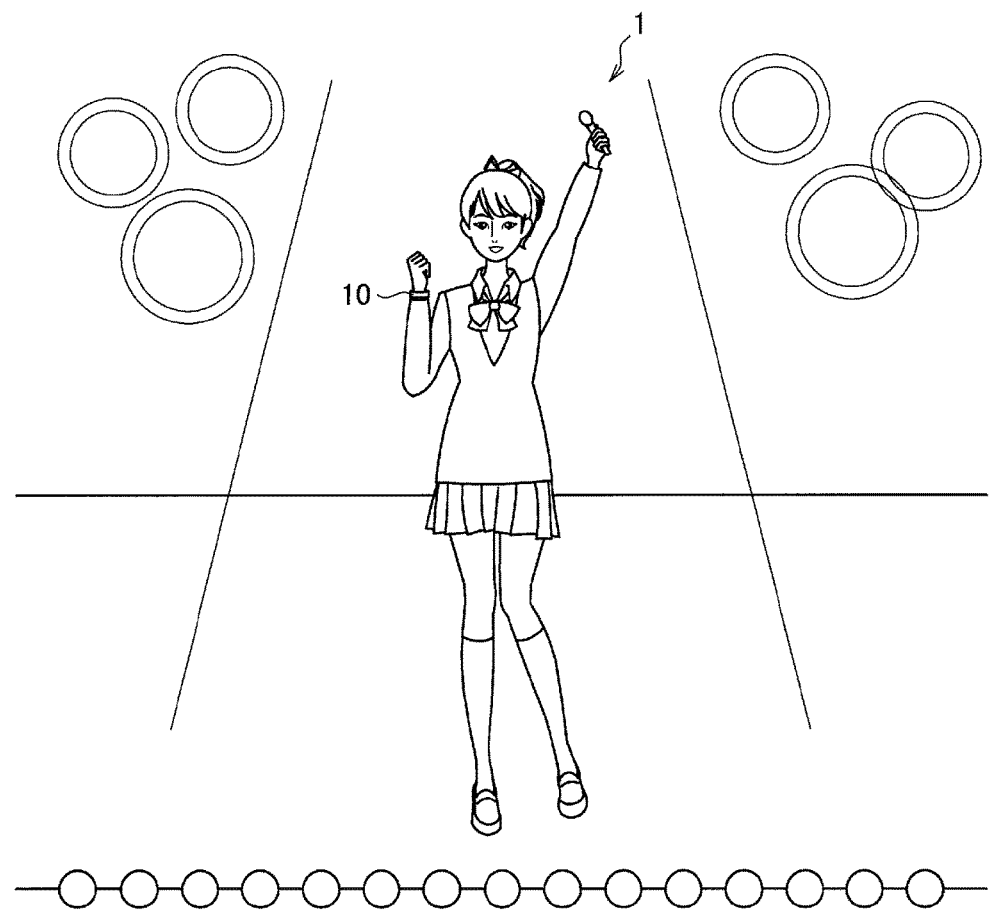
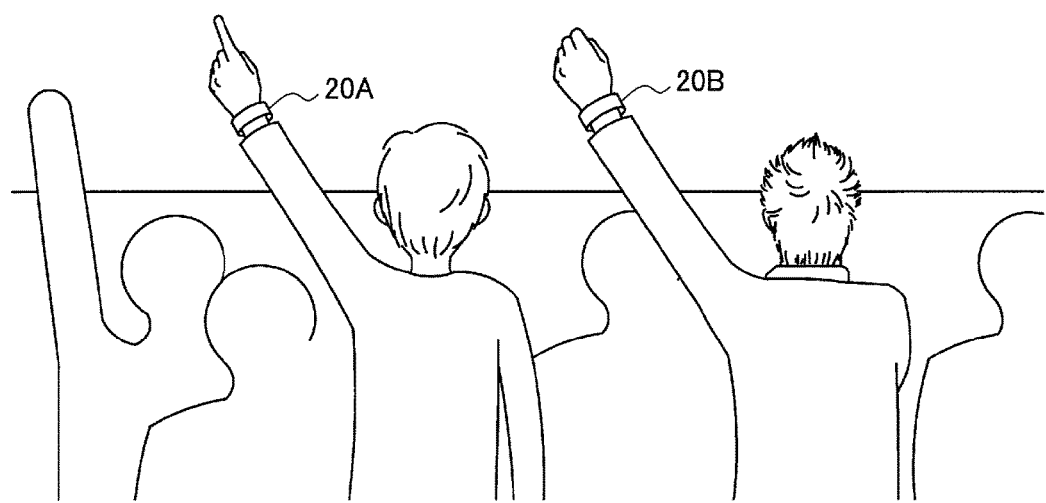

SYSTEM, TERMINAL APPARATUS, METHOD, AND RECORDING MEDIUM

CROSS REFERENCE TO PRIOR APPLICATION

This application is a National Stage Patent Application of PCT International Patent Application No. PCT/JP2017/013804 (filed on Mar. 31, 2017) under 35 U.S.C. § 371, which claims priority to U.S. Provisional Patent Application No. 62/319,412 (filed on Apr. 7, 2016), which are all hereby incorporated by reference in their entirety.

TECHNICAL FIELD

The present disclosure relates to a system, a terminal apparatus, a method, and a recording medium.

BACKGROUND ART

In recent years, opportunities to perform communication via networks have increased with the distribution of mobile terminals and advancement of network technologies. Thus, technologies for realizing a variety of kinds of communication utilizing networks have been developed.

A technology for realizing casual communication using tactile stimulation between users who wear wristband-type wearable terminals is disclosed in Patent Literature 1 listed below, for example.

CITATION LIST

Patent Literature

Patent Literature 1: WO 2015/029573

SUMMARY OF INVENTION

Technical Problem

However, the technology disclosed in Patent Literature 1 listed above is adapted such that counterparts are merely notified of vibration obtained by tapping the wristband-type terminals. Therefore, the amount of information delivered in the notification is small, and a sense of unity obtained through communication is limited.

Thus, the present disclosure provides a mechanism that enables rich communication using tactile simulation.

Solution to Problem

According to the present disclosure, there is provided a system including: a first terminal apparatus; and a plurality of second terminal apparatuses. The first terminal apparatus transmits first tactile information that has been generated by combining first sensor information related to a first user detected by sensors and indicates a state of the first user. The plurality of second terminal apparatuses receive and output the first tactile information.

In addition, according to the present disclosure, there is provided a terminal apparatus including: a control unit that transmits first tactile information that has been generated by combining first sensor information related to a first user detected by sensors and indicates a state of the first user.

In addition, according to the present disclosure, there is provided a terminal apparatus including: a control unit that receives and outputs first tactile information that has been generated by combining a plurality of pieces of first sensor information related to a first user detected by sensors and indicates a state of the first user.

In addition, according to the present disclosure, there is provided a method performed in a system including a first terminal apparatus and a plurality of second terminal apparatuses, the method including: by the first terminal apparatus, transmitting first tactile information that has been generated by combining first sensor information related to a first user detected by sensors and indicates a state of the first user; and by the plurality of second terminal apparatuses, receiving and outputting the first tactile information.

In addition, according to the present disclosure, there is provided a recording medium having a program recorded thereon, the program causing a computer to function as: a control unit that receives and outputs first tactile information that has been generated by combining a plurality of pieces of first sensor information related to a first user detected by sensors and indicates a state of the first user.

According to the present disclosure, tactile information generated by combining sensor information related to a first user, which has been transmitted from a first terminal apparatus, is output by a plurality of second terminal apparatuses. Since the tactile information is generated by a plurality of pieces of sensor information, it becomes possible to perform richer communication using tactile stimulation as compared with a case in which the tactile information is generated on the basis of a single piece of sensor information.

Advantageous Effects of Invention

According to the present disclosure, a mechanism that enables rich communication using tactile stimulation as described above is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing an outline of a system according to an embodiment.

DESCRIPTION OF EMBODIMENTS

Figure 2:
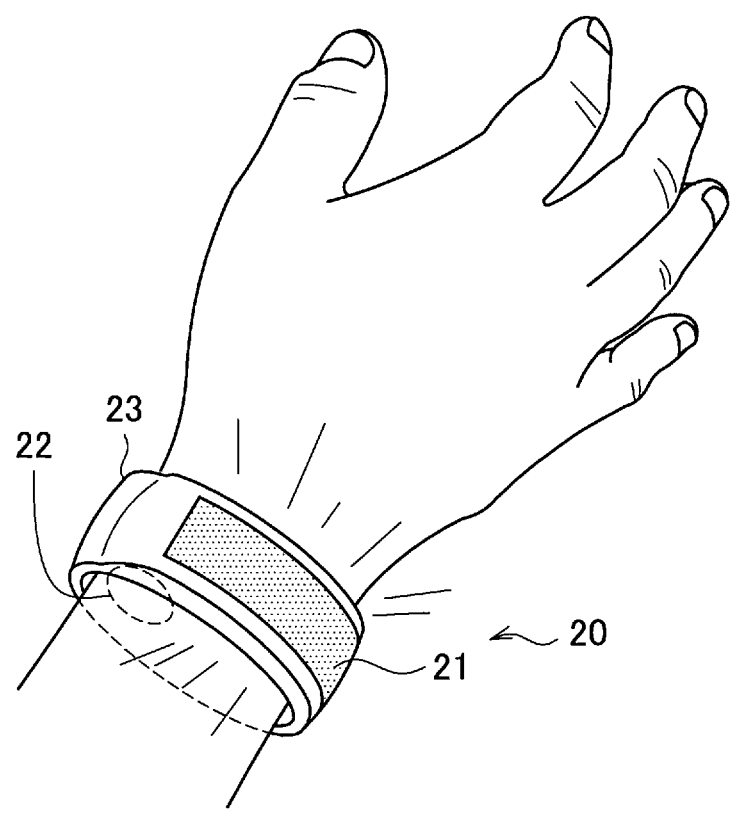
FIG. 2 is a diagram for describing an example of an exterior configuration of a second terminal apparatus according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, different letters will be added to the same reference numerals in the specification and the drawings in some cases to distinguish elements that have substantially the same functional configurations. For example, a plurality of elements that have substantially the same functional configurations are distinguished as terminal apparatuses 10A, 10B, and 10C as needed. However, only the same reference numerals will be given in cases in which it is not particularly necessary to distinguish the plurality of elements that have substantially the same functional configurations. For example, in a case in which it is not necessary to particularly distinguish the terminal apparatuses 10A, 10B, and 10C, the terminal apparatuses 10A, 10B, and 10C will be simply referred to as a terminal apparatus 10.

Not that description will be given in the following order.
1. Outline
2. Technical features
2.1. Physical configuration example
2.2. Example of theoretical configuration
2.3. Processing of generating distribution information
2.4. Processing of distributing and outputting distribution information
2.5. Flow of processing
3. Examples
3.1. First example
3.2. Second example
3.3. Third example
3.4. Fourth example
3.5. Fifth example
4. Example of hardware configuration
5. Conclusion

1. OUTLINE

First, an outline of a system according to an embodiment of the present disclosure will be described with reference to FIG. 1.

FIG. 1 is a diagram for describing the outline of the system according to the embodiment. As illustrated in FIG. 1, a system 1 can be applied to a concert hall for live music performances by artists such as entertainers, for example. An artist wears a first terminal apparatus 10 while the audience wears second terminal apparatuses 20 (20A or 20B). The system 1 provides distribution services in which distribution information generated on the basis of sensor information detected by the first terminal apparatus 10 is distributed to the second terminal apparatuses 20. Note that the distribution means transmission to users who are distribution destinations.

The distribution information is information that is generated on the basis of sensor information related to the user who is the distribution source and is distributed to the users as the distribution destinations. For example, the distribution information includes a variety of information such as sound information, image information, information indicating action recognition results, biological information, information indicating persons who are staying together, and position information. In particular, the distribution information includes tactile information in the example. The tactile information is information that is felt through the skin, such as pressure, temperature, vibration, texture, and pain. It is possible to strengthen a sense of unity that the users who are the distribution destinations feel with a user who is a distribution source by the tactile information being distributed. Also, the users who are the distribution destinations can enjoy the distribution services without people in their surroundings being aware of it.

In the example illustrated in FIG. 1, sensor information indicating a heart rate, a motion state, and the like of an artist on a stage is detected by the first terminal apparatus 10, and distribution information is generated on the basis of the sensor information. Then, the distribution information is distributed to the audience in a concert hall through one-to-many wireless communication in real time. This makes it possible to give the audience a sense of unity between the artist and the audience. In another case, the distribution information may be distributed to users who are staying at different places, such as an audience who watches a live performance through television receivers and the like. Also, the users are not necessarily limited to an audience who watches a performance in real time, and the distribution information may be distributed to an audience who watches a recorded movie, for example, in synchronization with the reproduced movie. In any case, the users who are the distribution destinations can feel the sense of unity with the user who is the distribution source.

Such distribution service can be applied to watching sports, for example, in addition to a live music performance. In this case, the system 1 can provide a sense of unity between athletes and spectators.

The distribution services can also be applied to scenarios in which real time properties are not required or degrees of requirement are low in addition to scenarios which require real time properties, such as watching a live music performance or watching sports. For example, distribution information generated on the basis of sensor information detected in everyday life of a user who is a distribution source, such as an entertainer, who is wearing the first terminal apparatus 10 may be distributed to users who are the distribution destinations. According to such services, fans can always feel a sense of unity with the entertainer, for example.

Hereinafter, a user associated with the first terminal apparatus 10 (for example, a user who wears or carries the first terminal apparatus 10) will also be referred to as a first user. In addition, a user associated with the second terminal apparatus 20 (for example, a user who wears or carries the second terminal apparatus 20) will also be referred to as a second user. Typically, the first user is a user who is a distribution source, and the second user is a user who is a distribution destination. It is a matter of course there are also cases in which the first user is a user who is a distribution destination and the second user is a user who is a distribution source.

2. TECHNICAL FEATURES

Hereinafter, technical features according to the embodiment will be described with reference to FIGS. 2 to 8.

2.1. Physical Configuration Example

First, an example of a physical structure of the second terminal apparatus 20 will be described with reference to FIGS. 2 to 4.

FIG. 2 is a diagram for describing an example of an exterior configuration of the second terminal apparatus 20 according to the embodiment. As illustrated in FIG. 2, the second terminal apparatus 20 has a band unit 23 that is wound around a wrist of a user and whose length can be set. The second terminal apparatus 20 is worn on the wrist of the user with the band unit 23. In addition, the second terminal apparatus 20 has a light emitting unit 21 and a vibration unit 22 that is arranged on the opposite side of the light emitting unit 21 with the wrist interposed therebetween in a worn state as illustrated in FIG. 2. Note that the worn state indicates a state in which the second terminal apparatus 20 is worn on the wrist of the user.

The light emitting unit 21 is realized by a light emitting diode (LED), for example. The light emitting unit 21 is an example of an output device that outputs distribution information. The light emitting unit 21 may be formed into a planar shape, and the surface may uniformly emit light, or the light emitting unit 21 can emit light while changing colors or luminance in the respective regions. Typically, the light emitting unit 21 is arranged on the outer side of the wrist (that is, the back side of the hand) in the worn state. In this manner, the user can easily see the emitted light. Note that whether or not the apparatus is worn such that the light emitting unit 21 is arranged on the outer side of the wrist, that is, the wearing form, is estimated on the basis of an acceleration or the like detected, for example, when the user is walking and content of an output may be controlled in accordance with a result of the estimation. This is similarly true for other output devices such as the vibration unit 22 that output distribution information.

The vibration unit 22 is realized by an actuator capable of vibrating, for example. The vibration unit 22 is an example of an output device that outputs tactile information. The vibration unit 22 can vibrate in conjunction with light emission by the light emitting unit 21. In addition, the vibration unit 22 is typically arranged on the inner side of the wrist (that is, the side of the palm) in the worn state. In this manner, the user can receive outputs of the tactile information on the inner side of the wrist, which is a site with high tactile sensitivity.

The second terminal apparatus 20 has a structure capable of adjusting force of the band unit 23 fastened on the wrist of the user such that a strength at which the tactile sensation is presented can be adjusted. This point will be described with reference to FIG. 3.

Figure 3:
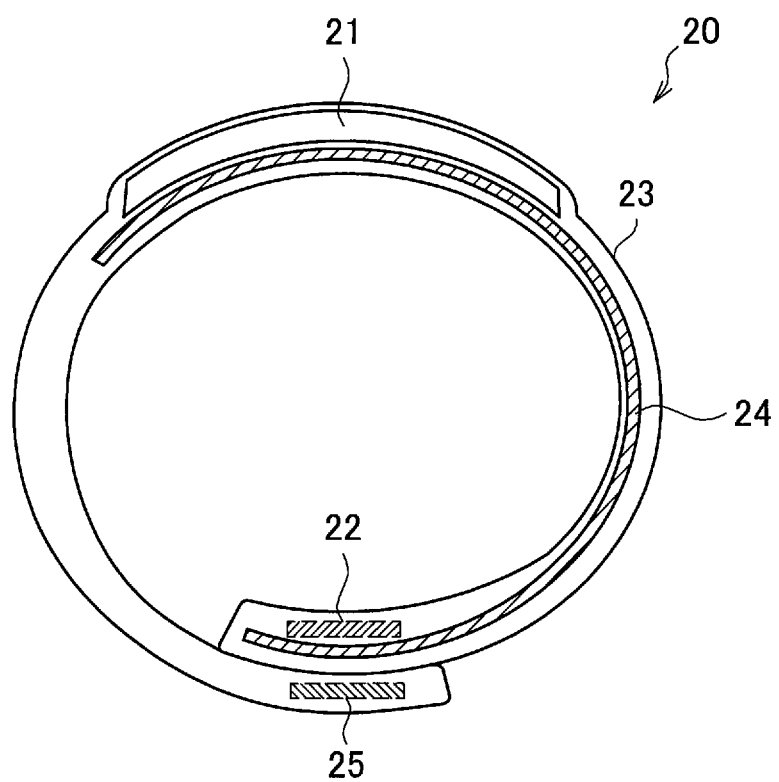
FIG. 3 is a diagram for describing an example of an interior structure of the second terminal apparatus according to the embodiment.

FIG. 3 is a diagram for describing an example of an interior structure of the second terminal apparatus 20 according to the embodiment. In FIG. 3, a sectional view of the second terminal apparatus 20 illustrated in FIG. 2 in the longitudinal direction of the light emitting unit 21. As illustrated in FIG. 3, the band unit 23 includes a shape maintaining unit 24 therein. The shape maintaining unit 24 includes a material that attracts a magnetic body such as iron. The band unit 23 has such a length that a tip end passes the other end and overlaps the other end when wound around the wrist of the user and has a magnet 25 at the tip end portion. The magnet 25 is attracted by the shape maintaining unit 24 and fixes the parts of the band unit 23 that overlap when wound around the wrist of the user. Here, the magnet 25 can fix the parts of the band unit 23 such that the circumferential length of the band unit 23 that is wound around the wrist of the user can be adjusted. Therefore, the user can adjust the strength at which the tactile sensation is presented by adjusting the position at which the magnet 25 is fastened.

Here, the shape maintaining unit 24 is positioned between the vibration unit 22 and the magnet 25 in the worn state. In this manner, the shape maintaining unit 24 can release magnetic force from the magnet 25 from the vibration unit 22 and prevent interference of the magnet 25 with the vibration unit 22.

Figure 4:
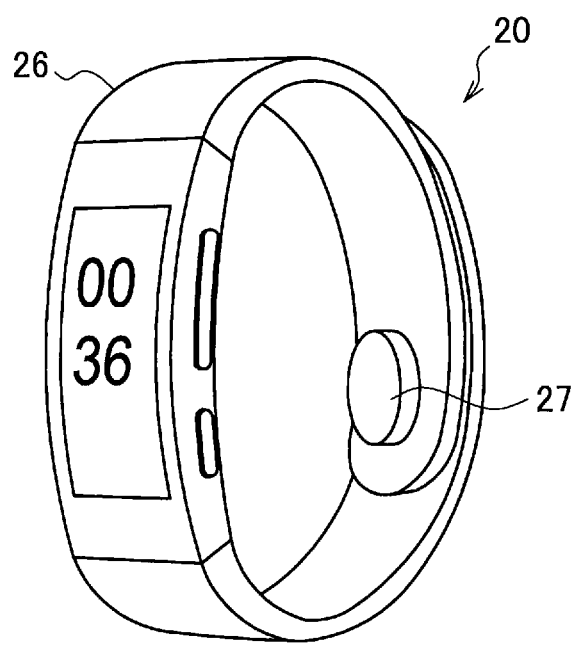
FIG. 4 is a diagram for describing another example of the exterior structure of the second terminal apparatus according to the embodiment.

FIG. 4 is a diagram for describing another example of the exterior configuration of the second terminal apparatus 20 according to the embodiment. As illustrated in FIG. 4, the second terminal apparatus 20 has a configuration in which an attachment 27 with a tactile sensation presenting function is attached to an existing wearable terminal 26 capable of interacting with a user through voice talking or the like. For example, the attachment 27 receives and outputs tactile information via a communication path of sound signals.

The physical configuration of the second terminal apparatus 20 has been described above. Note that the first terminal apparatus 10 may have a physical configuration that is similar to that of the second terminal apparatus 20. In more detail, the terminal apparatus that includes an output entity 70, which will be described later, may have the configuration described above with reference to FIGS. 2 to 4, and the second terminal apparatus 20 includes at least the output entity 70. In a case in which the first terminal apparatus 10 also includes the output entity 70, the first terminal apparatus 10 may have the configuration described above with reference to FIGS. 2 to 4. It is a matter of course that the first terminal apparatus 10 may have a physical configuration that is different from that of the second terminal apparatus 20.

2.2. Example of Theoretical Configuration

Next, an example of a theoretical configuration of the system 1 will be described with reference to FIG. 5.

Figure 5:
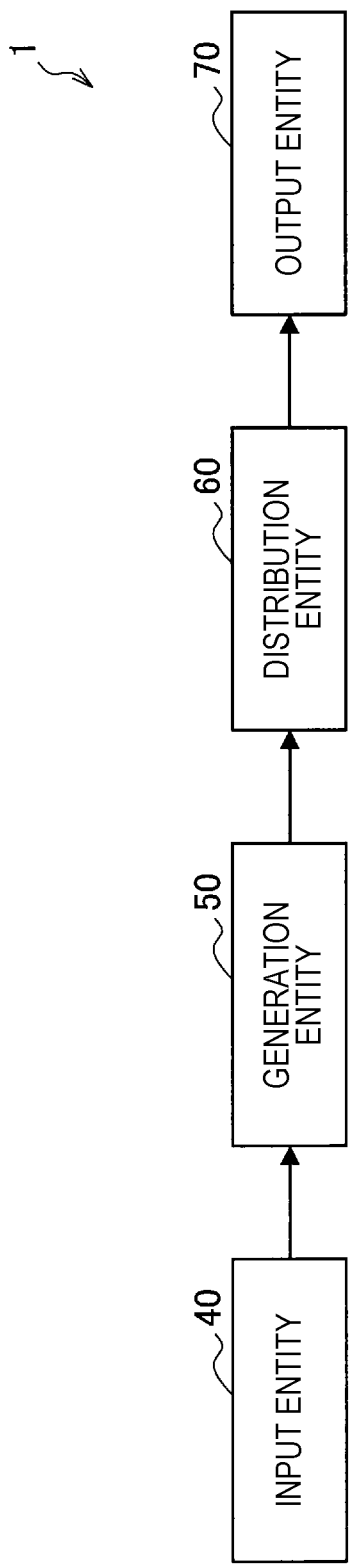
FIG. 5 is a diagram for describing an example of a theoretical configuration of the system according to the embodiment.

FIG. 5 is a diagram for describing an example of the theoretical configuration of the system 1 according to the embodiment. As illustrated in FIG. 5, the system 1 according to the embodiment includes a plurality of theoretical entities such as an input entity 40, a generation entity 50, a distribution entity 60, and an output entity 70.

The input entity 40 has a function of receiving inputs of sensor information related to the user who is a distribution source. In other words, the input entity 40 has a function of detecting the sensor information related to the user who is a distribution source. The input entity 40 can be realized such that the input entity 40 includes a variety of sensor devices. For example, the input entity 40 can include at least any of a camera, a depth sensor, a microphone, the GPS, an infrared sensor, a light beam sensor, a myoelectric sensor, a neural sensor, a heart rate sensor, a pulse sensor, a body temperature sensor, a gyro sensor, an acceleration sensor, and a touch sensor. In addition, the input entity 40 may include a device that receives active inputs from the user who is the distribution source, such as an electronic musical instrument, a keyboard, or a mouse, and inputs to these devices may also be regarded as sensor information. In addition, the input entity 40 may include a reception device that receives radio signals from a wireless communication device, a global navigation satellite system (GNSS) receiver, or the like, and signals received by these devices may also be regarded as sensor information. The input entity 40 transmits the input sensor information to the generation entity 50.

The generation entity 50 has a function of generating distribution information on the basis of the sensor information input (that is, detected) by the input entity 40. In particular, the generation entity 50 according to the embodiment generates tactile information on the basis of the sensor information. Description of specific generation processing will be given later and is thus omitted here. The generation entity 50 transmits the generated distribution information to the distribution entity 60.

The distribution entity 60 has a function of controlling distribution of the distribution information generated by the generation entity 50. For example, the distribution entity 60 controls a timing at which the distribution information is distributed, a distribution destination, and the like and distributes the distribution information to the output entity 70.

The output entity 70 has a function of receiving the distribution information from the distribution entity 60 and outputting the distribution information. The output entity 70 can be realized such that the output entity 70 includes a variety of output devices.

For example, the output entity 70 can include an output device that outputs tactile information. For example, the output entity 70 may include a vibration device capable of vibrating, such as a vibration actuator or a voice coil actuator, and may vibrate. The output entity 70 may include a tactile sensation presenting device, such as an eccentric motor, and may present a tactile sensation. In addition, the output entity 70 may include a low-frequency generation device that causes a low-frequency wave to flow through a human body. In addition, the output entity 70 may include a force sense presenting device capable of controlling a shape or hardness and may control stiffness of a control target object. In addition, the output entity 70 may control fastening force of the band unit 23. The output entity 70 may output tactile information through a combination of a plurality of output devices.

In particular, it is desirable that the output entity 70 include a broadband actuator such as a voice coil actuator. In this manner, the output entity 70 can faithfully reproduce sound information and vibration information of the user who is the distribution source, which have been detected as analog information by a microphone, an acceleration sensor, or the like, and it becomes possible to provide a strong sense of unity with the user who is the distribution and realistic feeling to the user who is the distribution destination.

In addition, the output entity 70 can include an output device that outputs distribution information other than tactile information. For example, the output entity 70 can include at least any of a speaker or an earphone that outputs sound information, a display device that outputs image information, and a light emitting device that outputs light emission information.

The example of the theoretical configuration of the system 1 has been described above. The aforementioned theoretical entities can be mapped to arbitrary physical entities (for example, an information processing device, an electronic circuit, or the like). The input entity 40, the generation entity 50, the distribution entity 60, and the output entity 70 may each be mapped to a different physical entity, or two or more of the input entity 40, the generation entity 50, the distribution entity 60, and the output entity 70 may be mapped to the same physical entity. In addition, one theoretical entity may be mapped to a plurality of physical entities. A specific mapping example will be described in an example, which will be described later.

2.3. Processing of Generating Distribution Information

The generation entity 50 generates distribution information on the basis of sensor information detected in relation to the user who is a distribution source.

The generation entity 50 generates the distribution information by using the sensor information as the distribution information or performing predetermined processing thereon. In particular, the generation entity 50 generates tactile information as distribution information. It is desirable that the generated tactile information be information indicating a state of the user who is the distribution source, in particular. As the tactile information indicating the state of the user who is the distribution source, tactile information corresponding to action recognition information, tactile information corresponding to biological information such as a heart rate, tactile information corresponding to a person with them, tactile information corresponding to position information, and the like are considered. It becomes possible to provide a sense of unity with the user who is the distribution source to the user who is the distribution destination by such information being distributed. For example, the generation entity 50 generates distribution information by using sound information and vibration information detected as analog information by a microphone, an acceleration sensor, and the like as distribution information without change or by performing predetermined processing thereon. Since the analog information related to the user who is the distribution source is reproduced for the user who is the distribution destination in this manner, the user who is the distribution destination can have a sense of unity with the user who is the distribution source and physically experience a state of the user who is the distribution source with a realistic feeling.

Here, the distribution information is generated on the basis of sensor information related to unconscious actions of the user who is the distribution source. For example, the distribution information is generated on the basis of sensor information that can always be detected, such as a heart rate, and is constantly distributed. Therefore, the user who is the distribution source does not have to perform a task of recording a message or the like, and it is possible to provide distribution services with a significantly low burden.

The predetermined processing for generating distribution information will be described below in detail.

Abstraction

Typically, the value of distribution services is considered to be higher when the distribution information is richer and more detailed. However, a concern that privacy of the user who is the distribution source may be damaged can increase. Thus, the generation entity 50 may abstract the sensor information and generate the tactile information.

For example, the generation entity 50 may control whether or not to generate/transmit the distribution information on the basis of a state of the user who is the distribution source. Specifically, the generation entity 50 temporarily stops generation/transmission of the distribution information in a case in which the user who is the distribution source is in a specific state that is directly connected with a privacy problem, in particular, such as when the user who is the distribution source goes to a restroom. In this manner, it is possible to protect the privacy of the user who is the distribution source. The determination of whether or not the user who is the distribution source is in the specific state is made, for example, on the basis of position information, motion sensing information, and the like. Alternatively, information indicating whether or not the user who is the distribution source is in the specific state may be manually input by the user who is the distribution source.

For example, the distribution information may be generated by processing the sensor information using a predetermined generation rule. Specifically, the generation entity 50 generates the distribution information by arranging a prescribed pattern in a time series manner in accordance with the sensor information of the user who is the distribution source. The prescribed pattern is information that is prepared in advance for generating the distribution information and is an image, a waveform of vibration, or a waveform of sound, for example. For example, the generation entity 50 generates vibration information or sound information that reproduces a prescribed waveform expressing heart sound in beats per minute (BPM) in accordance with the heart rate.

For example, the distribution information may be generated using a generation rule corresponding to a state of the user who is the distribution source from among a plurality of generation rules. Specifically, the generation entity 50 determines a specific action, such as running, walking, sneezing, yawing, sleeping, or waking up, of the user who is the distribution source on the basis of the sensor information and generates the distribution information using a prescribed pattern corresponding to the determined specific action. In a case in which the user who is the distribution source sneezes, the generation entity 50 regards predetermined vibration information corresponding to sneezing as distribution information. Further, the generation entity 50 may generate the distribution information by processing the prescribed pattern corresponding to the specific action on the basis of the sensor information. In a case in which the user who is the distribution source is running, for example, the generation entity 50 generates the vibration information or the sound information that reproduces a prescribed waveform expressing vertical motion at the time of running in BPM in accordance with the speed. It becomes possible to protect privacy while keeping reality of the distribution information by such processing.

For example, the distribution information may be information obtained by abstracting a state of the user who is the distribution source in accordance with a set level. Specifically, the generation entity 50 generates the distribution information on the basis of sensor information allowed according to a set privacy level. Since the distribution information is generated on the basis of the sensor information for which there is less concern that the privacy of the user who is the distribution source will be harmed even if the information is distributed, such as a heart rate, a body temperature, the amount of action, and the like, for example, in this manner, it is possible to protect privacy of the user who is the distribution source. The privacy level may be automatically set in accordance with a status of the user who is the distribution source or may be manually set by the user who is the distribution source. An example of setting of the privacy level is illustrated in Table 1 below.

TABLE 1

Example of privacy level setting

| Privacy level | Sensor information as basis of tactile information |
|---|---|
| Level 5 | Sensed image (stationary image/moving image) |
| Level 4 | Sound information in surroundings detected as analog information, person with user |
| Level 3 | Vibration information in surroundings detected as analog information, of user |
| Level 2 | Amount of action, result of action recognition |
| Level 1 | Heart rate, body temperature |

According to Table 1 described above, tactile information is generated on the basis of sensor information for which there is less concern that privacy will be damaged as the level becomes lower. In a case in which Level 1 is set, for example, the generation entity 50 generates the tactile information on the basis of a heart rate or a body temperature. In addition, in a case in which Level 5 is set, the generation entity 50 generates the distribution information on the basis of a sensed movie.

Note that a counter value when a distribution service is received may be set in accordance with the privacy level. For example, a higher counter value may be set as the privacy level becomes higher. In this manner, the user who is the distribution destination can receive provision of desired distribution information by paying a counter value in accordance with a level at which the user desires to know the information.

Combination

According to the aforementioned abstraction, while it is possible to protect the privacy of the user who is the distribution source, richness of the distribution information is likely to be damaged, for example, one-pattern information can be provided. Thus, the generation entity 50 may generate the distribution information by combining a plurality of pieces of sensor information.

In detail, the generation entity 50 generates the tactile information indicating a state of the user who is the distribution source by combining a plurality of pieces of sensor information. It is possible to generate wide tactile information by combining a plurality of pieces of sensor information, and rich communication using tactile stimulation is realized. In addition, since the sensor information is not provided to the user who is the distribution destination without change but is provided after being processed, it is possible to protect the privacy of the user who is the distribution source.

The tactile information may be tactile information generated by modulating sensor information detected in relation to the user who is the distribution source on the basis of other detected sensor information. Specifically, the generation entity 50 generates the tactile information such as vibration information by applying processing based on at least any of biological information, action recognition information, image information, and position information to sound information detected by a microphone or the like or a waveform detected by an acceleration sensor or the like. Specific processing that increases variations of the distribution information and enables protection of the privacy of the user who is the distribution source in this manner will be described below.

For example, the tactile information may be vibration information obtained by modulating vibration information based on a heart rate of the user who is the distribution source on the basis of body temperature information of the user who is the distribution source. Specifically, the generation entity 50 performs processing of strengthening a feeling of a heart rate (that is, increasing the amplitude) in a case in which the body temperature of the user who is the distribution source is higher than a threshold value and weakening the feeling of the heart rate (that is, reducing the amplitude) in a case in which the body temperature is lower than the threshold value. In this manner, it becomes possible to provide not only a heart rate but also tactile information with the amount of information.

Figure 6:
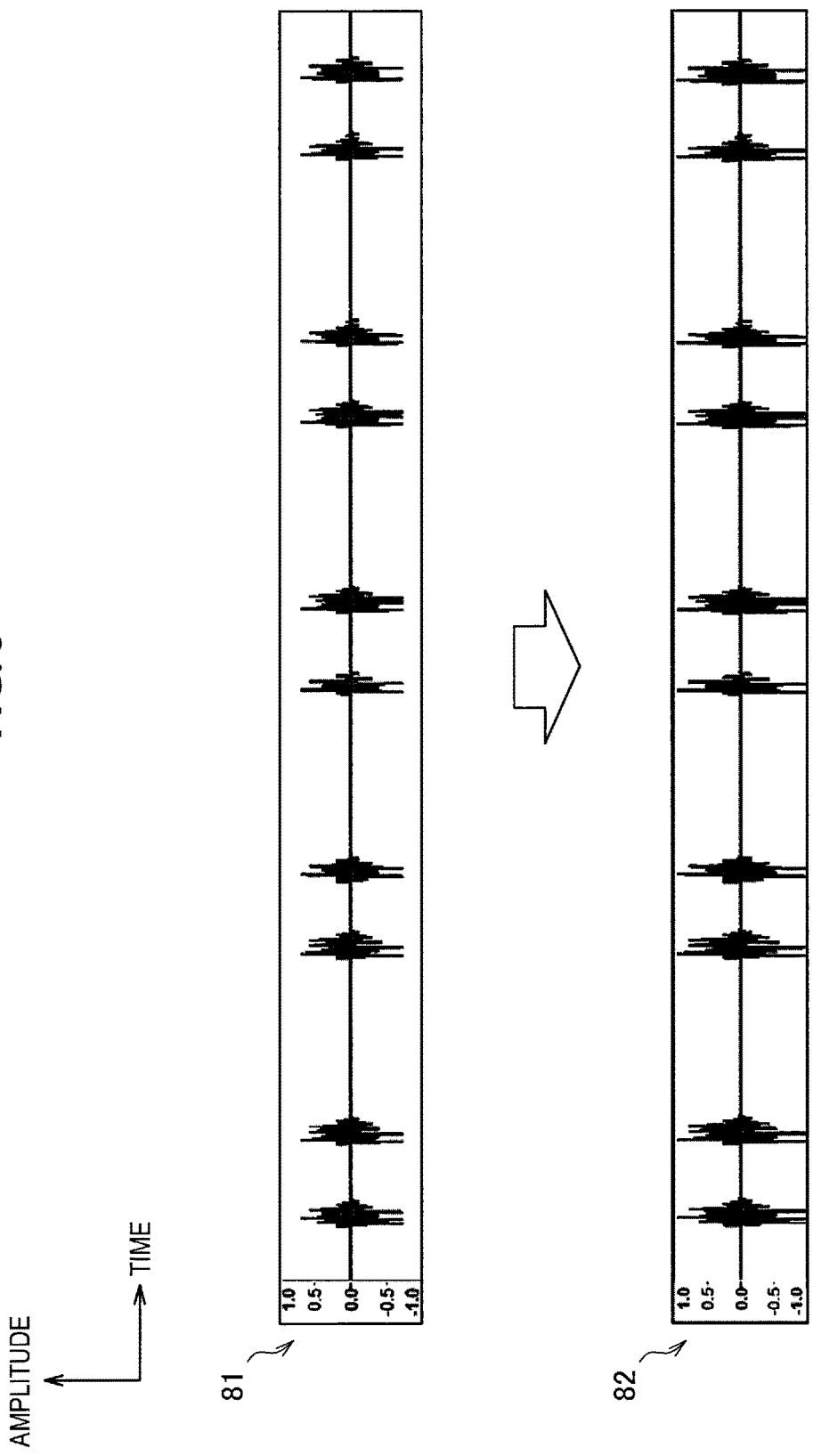
FIG. 6 is a diagram for describing an example of processing of generating tactile information according to the embodiment.

An example of such modulation will be described with reference to FIG. 6. FIG. 6 is a diagram for describing an example of processing of generating tactile information according to the embodiment. A waveform 81 illustrated in FIG. 6 is vibration information that reproduces a prescribed waveform expressing heart sound in BPM in accordance with the detected heart rate. Meanwhile, a waveform 82 is vibration information obtained by modulating the vibration information represented by the waveform 81 on the basis of body temperature information of the user who is the distribution source, and processing of increasing the amplitude has been performed because the body temperature of the user who is the distribution source is higher than the threshold value.

For example, the tactile information may be vibration information obtained by modulating vibration information based on an action of the user who is the distribution source on the basis of sound information in the surroundings of the user who is the distribution source. Specifically, the generation entity 50 performs processing of adding high-frequency noise with a magnitude in accordance with a noise sound status in the surroundings of the user who is the distribution source to the vibration information based on the action of the user who is the distribution source. In this manner, it is possible to provide not only vibration in accordance with the simple action but also tactile information with the amount of information.

Figure 7:
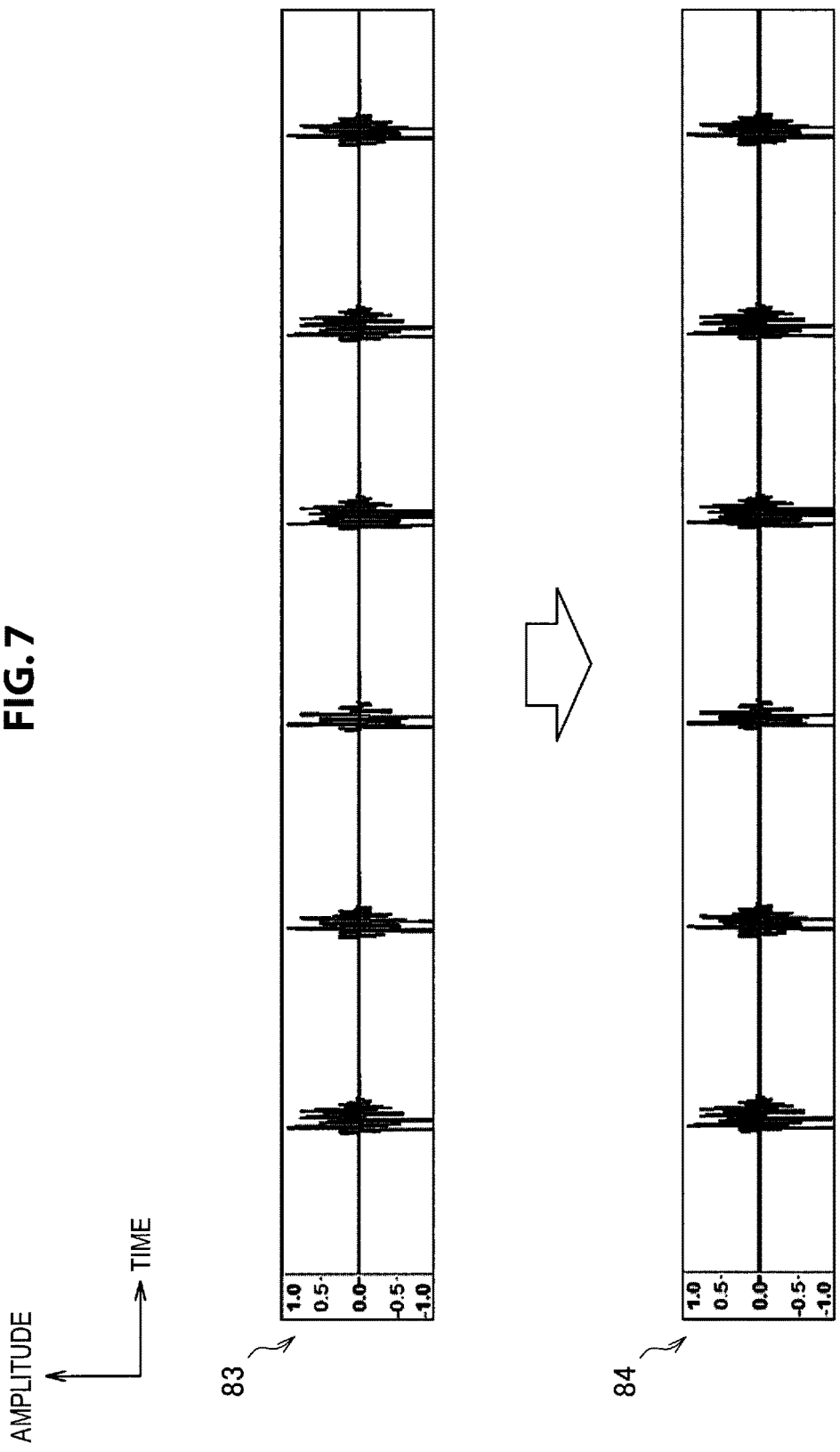
FIG. 7 is a diagram for describing an example of processing of generating tactile information according to the embodiment.

An example of such modulation will be described with reference to FIG. 7. FIG. 7 is a diagram for describing an example of processing of generating tactile information according to the embodiment. A waveform 83 illustrated in FIG. 7 is vibration information that reproduces a prescribed waveform expressing vertical motion at the time of running, which is generated in a case in which the user who is the distribution source is running, in BPM in accordance with the speed. Meanwhile, a waveform 84 is vibration information obtained by modulating the vibration information represented by the waveform 83 on the basis of a noise sound status in the surroundings of the user who is the distribution source, and processing of adding high-frequency noise in accordance with the noise sound status is performed.

2.4. Processing of Distributing and Outputting Distribution Information (1) Distribution Route Distribution information is transmitted from the distribution entity 60 to the output entity 70 via a wireless communication path.

The wireless communication path may follow arbitrary wireless communication standards such as Bluetooth (registered trademark), Zigbee (registered trademark), Wi-Fi (registered trademark), or cellular communication standards such as 4G or 5G. In addition, the wireless communication path may be formed in an arbitrary frequency band such as FM electric waves, a 920 MHz band, or a 2.4 GHz band or may be formed using infrared rays.

The distribution entity 60 and the output entity 70 may communicate directly or via a local area network. The wireless communication path used in this case will also be referred to as a first wireless communication path. In a case in which the user who is the distribution source and the user who is the distribution destination are at the same location (for example, a live concert hall), for example, it is possible to reduce a time lag until the distribution information is output after detection of the sensor information by the distribution information being distributed via the 920 MHz band.

It is a matter of course that the distribution entity 60 and the output entity 70 may be able to communicate via a global area network. The wireless communication path in this case will also be referred to as a second wireless communication path. In a case in which the user who is the distribution source and the user who is the distribution destination are at different locations, distribution information is distributed via a cellular communication network, the Internet, or the like. In this case, a time lag required for the distribution is allowed.

In addition, different distribution information may be generated in accordance with a wired communication path used for transmitting the distribution information to the output entity 70. In a case in which the distribution information is distributed using the first wireless communication path, for example, information that requires a real time property may be generated as the distribution information. Meanwhile, in a case in which the distribution information is distributed using the second wireless communication path, information that does not require the real time property may be generated as the distribution information.

(2) Distribution Timing

Various timings of distribution of the distribution information by the distribution entity 60 are considered.

Real Time Distribution

The distribution entity 60 may distribute distribution information in real time.

For example, distribution information based on sensor information that can be constantly detected, such as a heart rate, may be constantly distributed.

It is a matter of course that distribution information based on sensor information that can be constantly detected, such as a heart rate, may be distributed at a predetermined timing instead of being constantly distributed. This can lead to modulated distribution information. For example, distribution information (for example, vibration information indicating that a heart rate steeply increases in a short period of time) generated on the basis of a prescribed pattern indicating how the heart rate has changed may be distributed at the timing of the change of the heart rate. In addition, distribution information (for example, vibration information expressing vertical motion when the user who is the distribution source is going upstairs at a timing at which the user starts to go upstairs) generated based on a prescribed pattern expressing a change in action recognition information at a timing at which the action recognition information changes may be distributed, for example.

For example, distribution information based on sensor information suddenly detected, such as distribution information based on a specific action such as sneezing, may be distributed at a timing at which the specific action is detected.

Non-Real Time Distribution

The distribution entity 60 may distribute distribution information in non-real time. For example, the distribution entity 60 accumulates generated distribution information.

Then, the distribution information may be transmitted from the distribution entity 60 to the output entity 70 in response to a request from the output entity 70.

(3) Output Timing

An output timing of the distribution information by the output entity 70 is considered in various manners.

For example, the output entity 70 may output the distribution information at a timing at which the distribution information is received. Since the real time property of the distribution information increases in this manner, it becomes possible to provide a strong sense of unity with the user who is the distribution source to the user who is the distribution destination.

For example, the output entity 70 may output the distribution information at a timing at which a predetermined condition is satisfied. As the predetermined condition, for example, the user who is the distribution destination conducting a predetermined action is exemplified. For example, the output entity 70 may output the distribution information at a timing at which the user who is the distribution destination inputs an output command. In this manner, the output entity 70 can output the distribution information at a timing that is convenient for the user who is the distribution destination. For example, the output entity 70 may output the distribution information at a timing at which the user who is the distribution destination conducts an action that is the same as that of the user who is the distribution source or an action set by the user who is the distribution source. In addition, the output entity 70 may provide a command about what kind of action is to be taken to output the distribution information to the user who is the distribution destination. In this manner, it is possible to provide a strong sense of unity with the user who is the distribution source to the user who is the distribution destination.

2.5. Flow of Processing

Hereinafter, an example of a flow of processing of providing a distribution service will be described with reference to FIG. 8.

Figure 8:
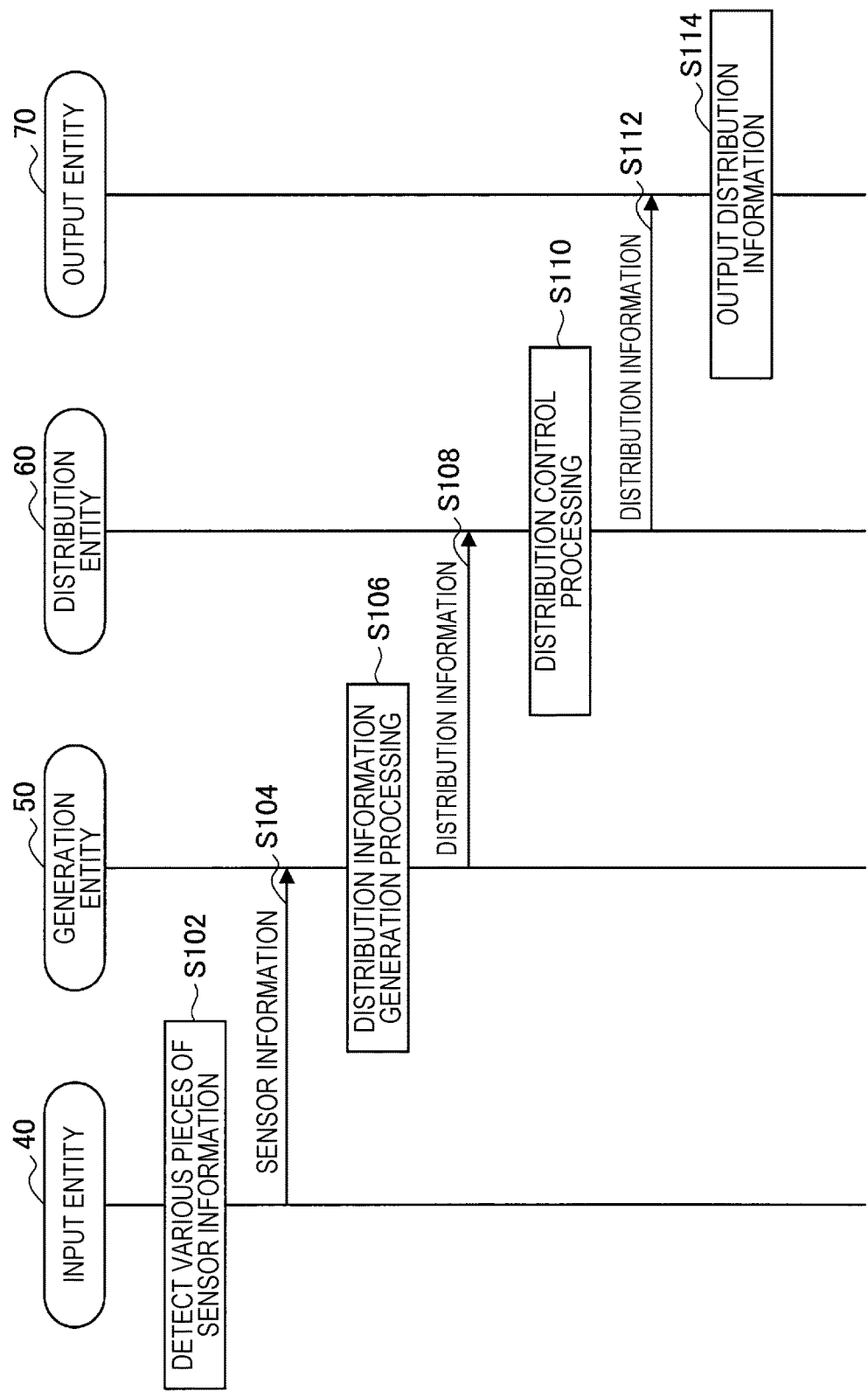
FIG. 8 is a sequence diagram for describing an example of a flow of processing of providing a distribution service that is executed by the system according to the embodiment.

FIG. 8 is a sequence diagram for describing the example of the flow of the processing of providing a distribution service, which is executed by the system 1 according to the embodiment. As illustrated in FIG. 8, the input entity 40, the generation entity 50, the distribution entity 60, and the output entity 70 are involved in the sequence.

First, the input entity 40 detects various pieces of sensor information (Step S102) and transmits the detected sensor information to the generation entity 50 (Step S104).

Then, the generation entity 50 performs distribution information generation processing of generating distribution information on the basis of the received sensor information (Step S106). In particular, the generation entity 50 generates tactile information by combining or abstracting a plurality of pieces of sensor information. Next, the generation entity 50 transmits the generated distribution information to the distribution entity 60 (Step S108).

The distribution entity 60 performs distribution control processing of controlling a distribution timing, a distribution destination, and the like of the received distribution information (Step S110) and transmits the distribution information to the output entity 70 in accordance with a result of the control (Step S112).

Then, the output entity 70 outputs the received distribution information (Step S114).

3. EXAMPLES

Hereinafter, specific examples related to the system 1 according to the embodiments will be described.

3.1. First Example

This example is an example in which a system 1 includes a first terminal apparatus 10 and a plurality of second terminal apparatuses 20 (20A and 20B) and unidirectional distribution is performed. Hereinafter, the example will be described with reference to FIG. 9.

Figure 9:
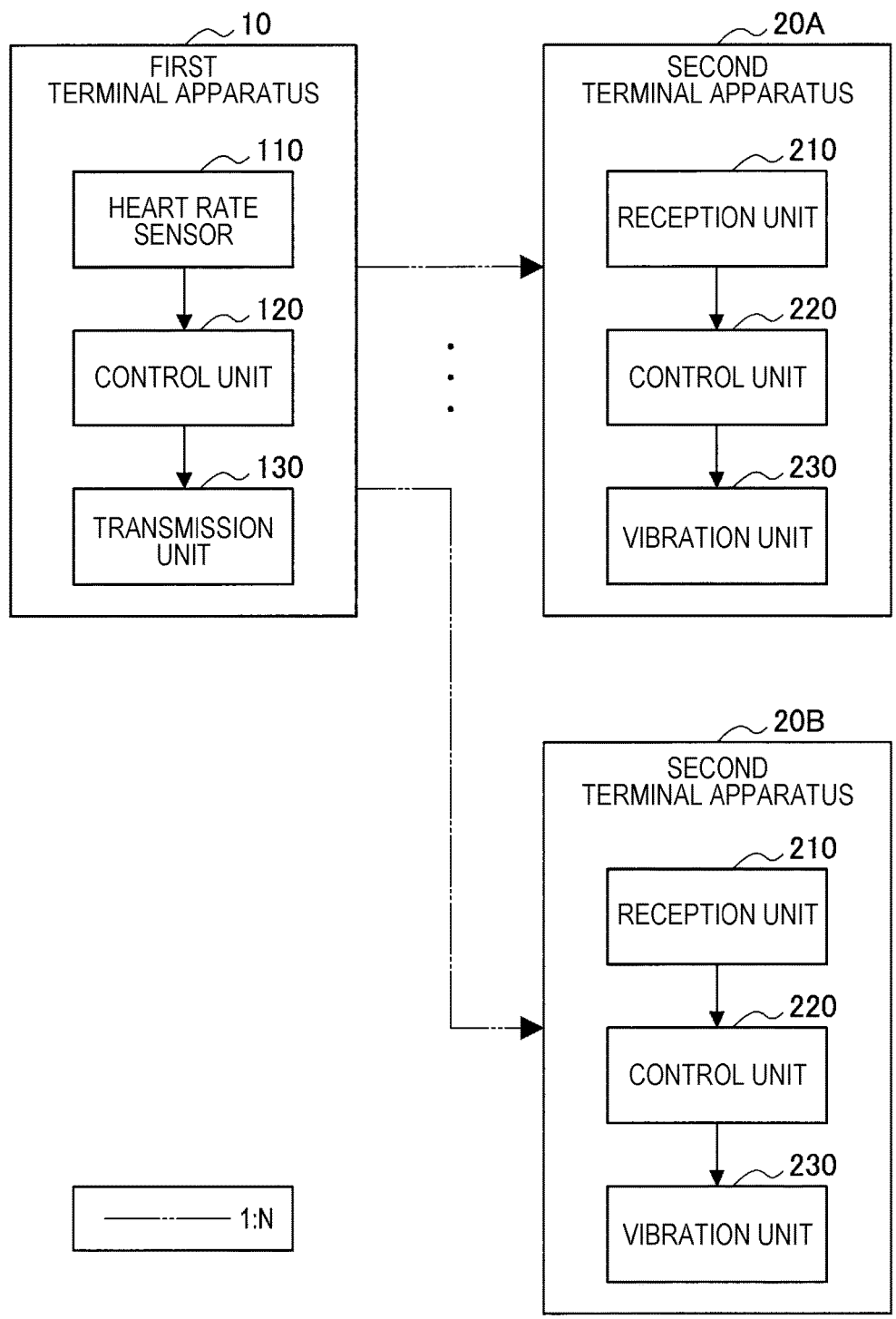
FIG. 9 is a diagram illustrating an example of a configuration of a system according to a first example.

FIG. 9 is a diagram illustrating an example of a configuration of the system 1 according to the first example. As illustrated in FIG. 9, the system 1 includes the first terminal apparatus 10 and the plurality of second terminal apparatuses 20. In the embodiment, an input entity 40, a generation entity 50, and a distribution entity 60 are mapped in the first terminal apparatus 10 while output entities 70 are mapped in the second terminal apparatuses 20. The first terminal apparatus 10 detects sensor information related to a first user, generates distribution information, and distributes the distribution information to the plurality of second terminal apparatuses 20. The second terminal apparatuses 20 receive and output the distribution information. Note that the first user is a user who is a distribution source while the second user is a user who is a distribution destination.

As illustrated in FIG. 9, the first terminal apparatus 10 includes a heart rate sensor 110, a control unit 120, and a transmission unit 130. The heart rate sensor 110 is a sensor device that detects heart rate information. The control unit 120 generates distribution information (tactile information, in particular) based on the detected heart rate information and performs distribution control. It is a matter of course that the aforementioned generation processing such as abstraction and combination may be performed although the description thereof is omitted in the example. The transmission unit 130 distributes the distribution information to the plurality of second terminal apparatuses 20 under control performed by the control unit 120.

As illustrated in FIG. 9, each second terminal apparatus 20 includes a reception unit 210, a control unit 220, and a vibration unit 230. The reception unit 210 receives the distribution information from the first terminal apparatus 10. The control unit 220 performs output control based on the distribution information received by the reception unit 210. The vibration unit 230 outputs tactile information in the distribution information under the control performed by the control unit 220.

Here, wireless communication between the first terminal apparatus 10 and the second terminal apparatus 20 is one-to-many (that is, one-to-N) communication (for example, multicasting or broadcasting). That is, the same distribution information is transmitted (that is, broadcasted) from the first terminal apparatus 10 to the plurality of second terminal apparatuses 20. For example, Bluetooth, Zigbee, 920 MHz band digital communication, Wi-Fi, infrared communication, FM electric waves, or the like can be used as the wireless communication path between the first terminal apparatus 10 and the second terminal apparatuses 20. However, there is a concern that the size of the first terminal apparatus 10 increases in order to send electric waves to a large number of second terminal apparatuses 20, that is, in a wide range.

The example can be applied to live music performance, for example. In this case, one artist is the first user, and large audiences are the second users.

The first terminal apparatus 10 may include input devices such as an acceleration sensor, a switch, and an electronic musical instrument in addition to the heart rate sensor. In addition, each second terminal apparatus 20 may include a tactile sensation presenting device such as an eccentric motor, a display device, a sound output device, a light emitting device, and the like. A configuration example including such other devices is illustrated in FIG. 10.

Figure 10:
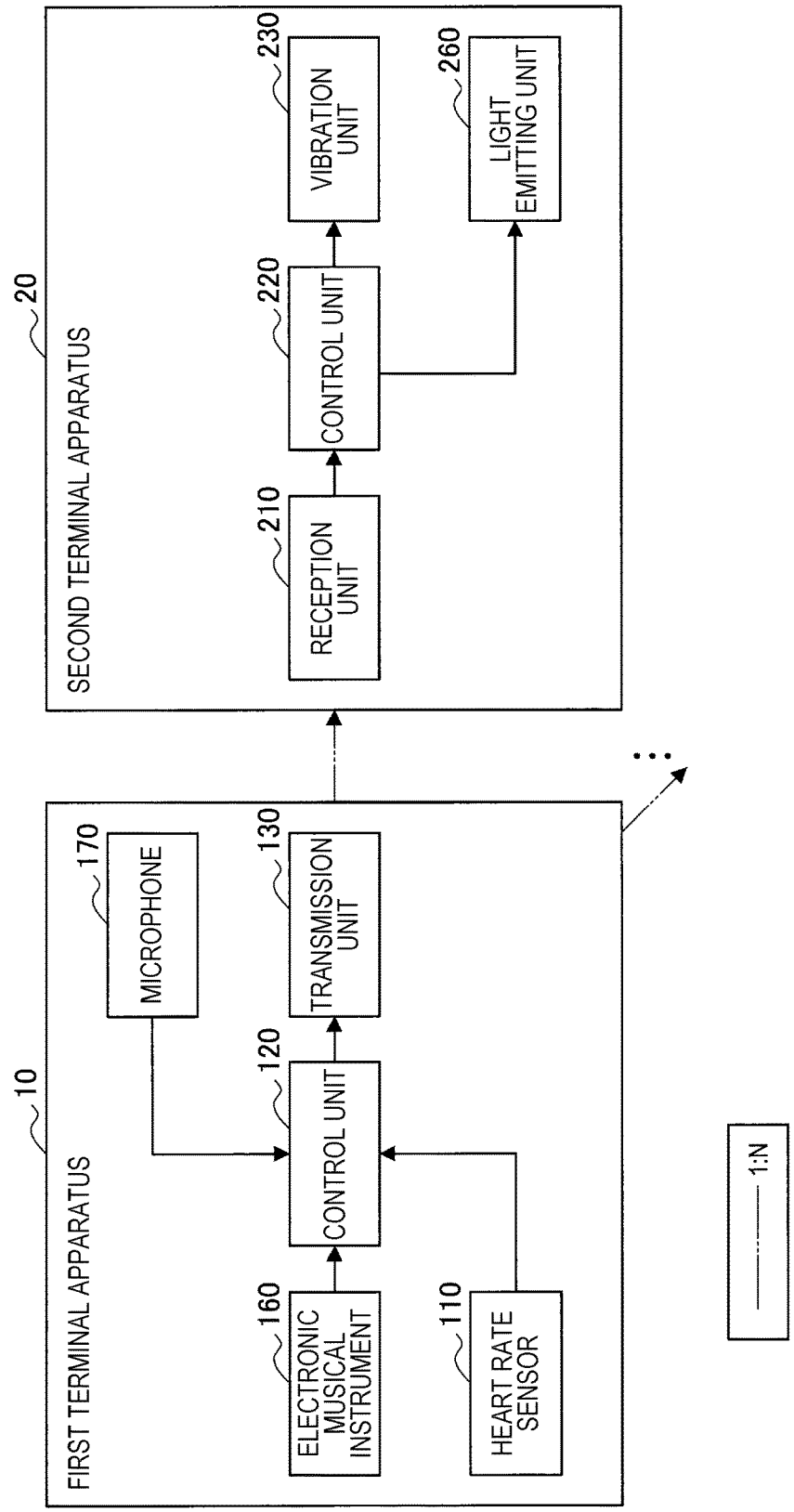
FIG. 10 is a diagram illustrating an example of a configuration of a system according to a first example.

FIG. 10 is a diagram illustrating an example of a configuration of the system 1 according to the first example. As illustrated in FIG. 10, the system 1 includes the first terminal apparatus 10 and the plurality of second terminal apparatuses 20. The first terminal apparatus 10 includes an electronic musical instrument 160 and a microphone 170 in addition to the configuration illustrated in FIG. 9. The control unit 120 generates distribution information on the basis of heart rate information output from the heart rate sensor 110, audio information output from the electronic musical instrument 160, and sound information output from the microphone 170. Each second terminal apparatus 20 includes a light emitting unit 260 in addition to the configuration illustrated in FIG. 9. The distribution information includes vibration information for causing the vibration unit 230 to vibrate and light emission information for causing the light emitting unit 260 to emit light, the vibration unit 230 vibrates on the basis of the received vibration information, and the light emitting unit 260 emits light on the basis of the received light emission information. Here, the first terminal apparatus 10 may generate distribution information that reproduces a sound source position. For example, the vibration information may be generated on the basis of information of a left channel (L-ch) in the audio information and the sound information, and the light emission information may be generated on the basis of information of a right channel (R-ch) in the audio information and the sound information. In this manner, the second terminal apparatuses 20 can output the information of the left channel and the information of the right channel with different types of expression.

3.2. Second Example

This example is an example in which a system 1 includes a first terminal apparatus 10, a communication device 30, and a plurality of second terminal apparatuses 20 (20A and 20B) and unidirectional distribution is performed. The communication device 30 is a physical entity that mediates communication between the first terminal apparatus 10 and the second terminal apparatuses 20. Hereinafter, the example will be described with reference to FIG. 11.

Figure 11:
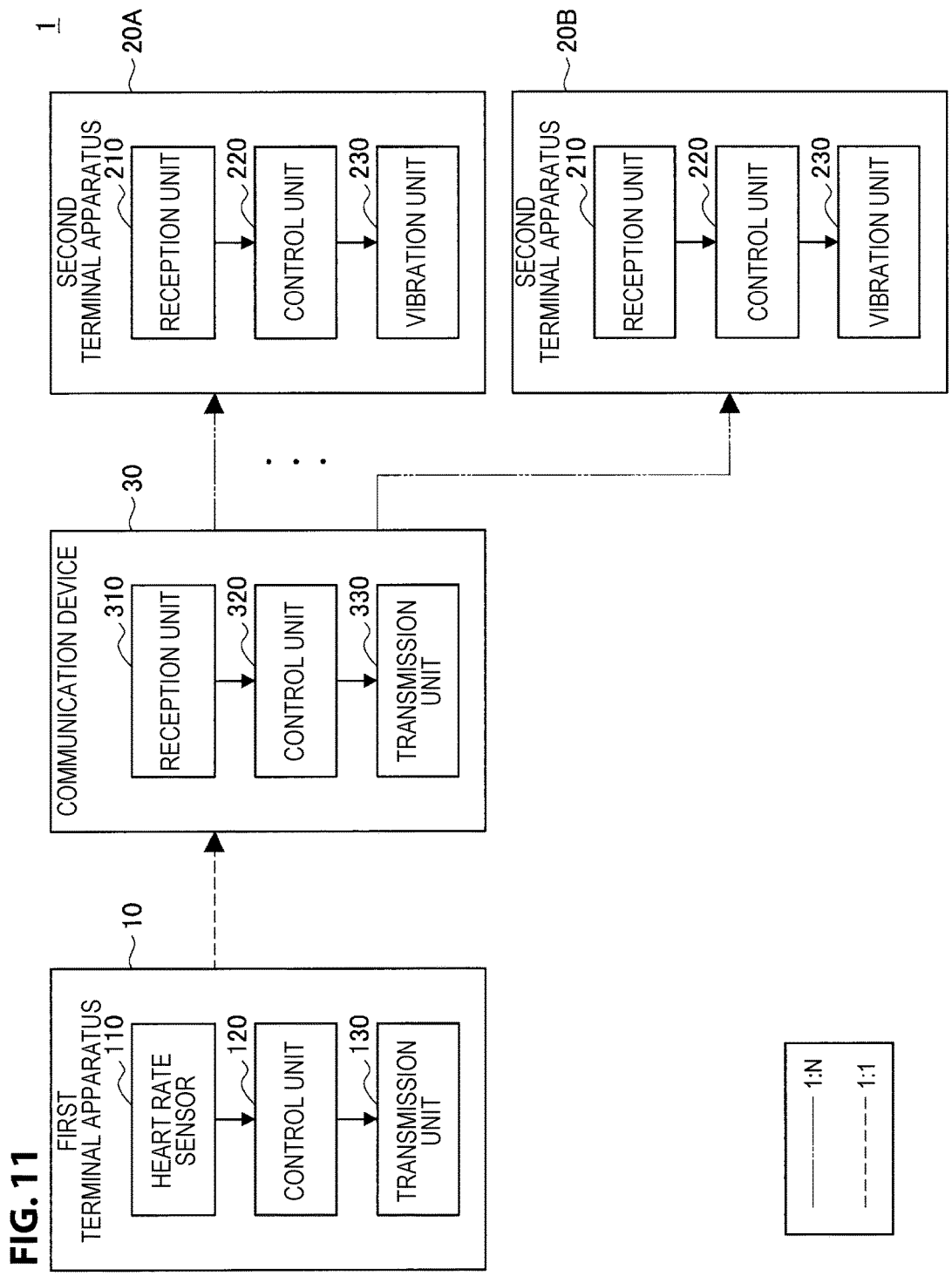
FIG. 11 is a diagram illustrating an example of a configuration of a system according to a second example.

FIG. 11 is a diagram illustrating an example of a configuration of the system 1 according to the second example. As illustrated in FIG. 11, the system 1 includes the first terminal apparatus 10, the communication device 30, and the plurality of second terminal apparatuses 20. In the example, an input entity 40 and a generation entity 50 are mapped in the first terminal apparatus 10, a distribution entity 60 is mapped in the communication device 30, and output entities 70 are mapped in the second terminal apparatuses 20. The first terminal apparatus 10 detects sensor information related to the first user, generates distribution information, and transmits the distribution information to the communication device 30. The communication device 30 performs distribution control and distributes the distribution information to the plurality of second terminal apparatuses 20. The second terminal apparatuses 20 receive and output the distribution information. Note that the first user is a user who is a distribution source while second users are users as distribution destinations.

As illustrated in FIG. 11, the first terminal apparatus 10 includes a heart rate sensor 110, a control unit 120, and a transmission unit 130. The heart rate sensor 110 is a sensor device that detects heart rate information. The control unit 120 generates distribution information on the basis of the detected heart rate information. It is a matter of course that the aforementioned generation processing such as abstraction and combination may be performed although the description thereof is omitted in the example. The transmission unit 130 transmits the distribution information generated by the control unit 120 to the communication device 30.

As illustrated in FIG. 11, the communication device 30 includes a reception unit 310, a control unit 320, and a transmission unit 330. The reception unit 310 receives distribution information from the first terminal apparatus 10. The control unit 220 performs distribution control of the distribution information received from the reception unit 210. The transmission unit 330 distributes the distribution information to the plurality of second terminal apparatuses 20 under control performed by the control unit 220.

As illustrated in FIG. 11, each second terminal apparatus 20 includes the reception unit 210, the control unit 220, and the vibration unit 230. The reception unit 210 receives the distribution information from the communication device 30. The control unit 220 performs output control based on the distribution information received by the reception unit 210. The vibration unit 230 outputs tactile information in the distribution information under control performed by the control unit 220.

Here, communication (wireless communication/wired communication) between the first terminal apparatus 10 and the communication device 30 is one-to-one communication (for example, unicasting or the like). For example, wireless communication standards with no broadcasting mechanisms, such as Bluetooth, may be used for the wireless communication path between the first terminal apparatus 10 and the communication device 30. In addition, wireless communication between the communication device 30 and the second terminal apparatuses 20 is one-to-N communication. That is, the same distribution information is transmitted (that is, broadcasted) from the communication device 30 to the plurality of second terminal apparatuses 20.

In the example, an electric power burden required by the first terminal apparatus 10 to transmit the distribution information is lower than that in the first example. In this manner, it is possible to reduce the size of the first terminal apparatus 10 and causes the first terminal apparatus 10 to drive with a small-sized battery. The communication device 30 is arranged near the first terminal apparatus 10, for example, and can be driven by an external power source such as an alternating current (AC) power source.

The communication device 30 may immediately process the distribution information received from the first terminal apparatus 10 and distribute the distribution information to the second terminal apparatuses in a situation, such as live music performance, for example, in which a real time property, is required. Meanwhile, the communication device 30 may accumulate the distribution information received from the first terminal apparatus 10 once and distribute the distribution information to the second terminal apparatus 20 after checking the content or performing processing such as merging. In this case, the communication device 30 may be configured as a server that has high calculation ability.

3.3. Third Embodiment

This example is an example in which a system 1 includes a plurality of first terminal apparatuses 10 (10A and 10B), a communication device 30, and a plurality of second terminal apparatuses 20 (20A and 20B) and unidirectional distribution is performed. Hereinafter, the example will be described with reference to FIG. 12.

Figure 12:
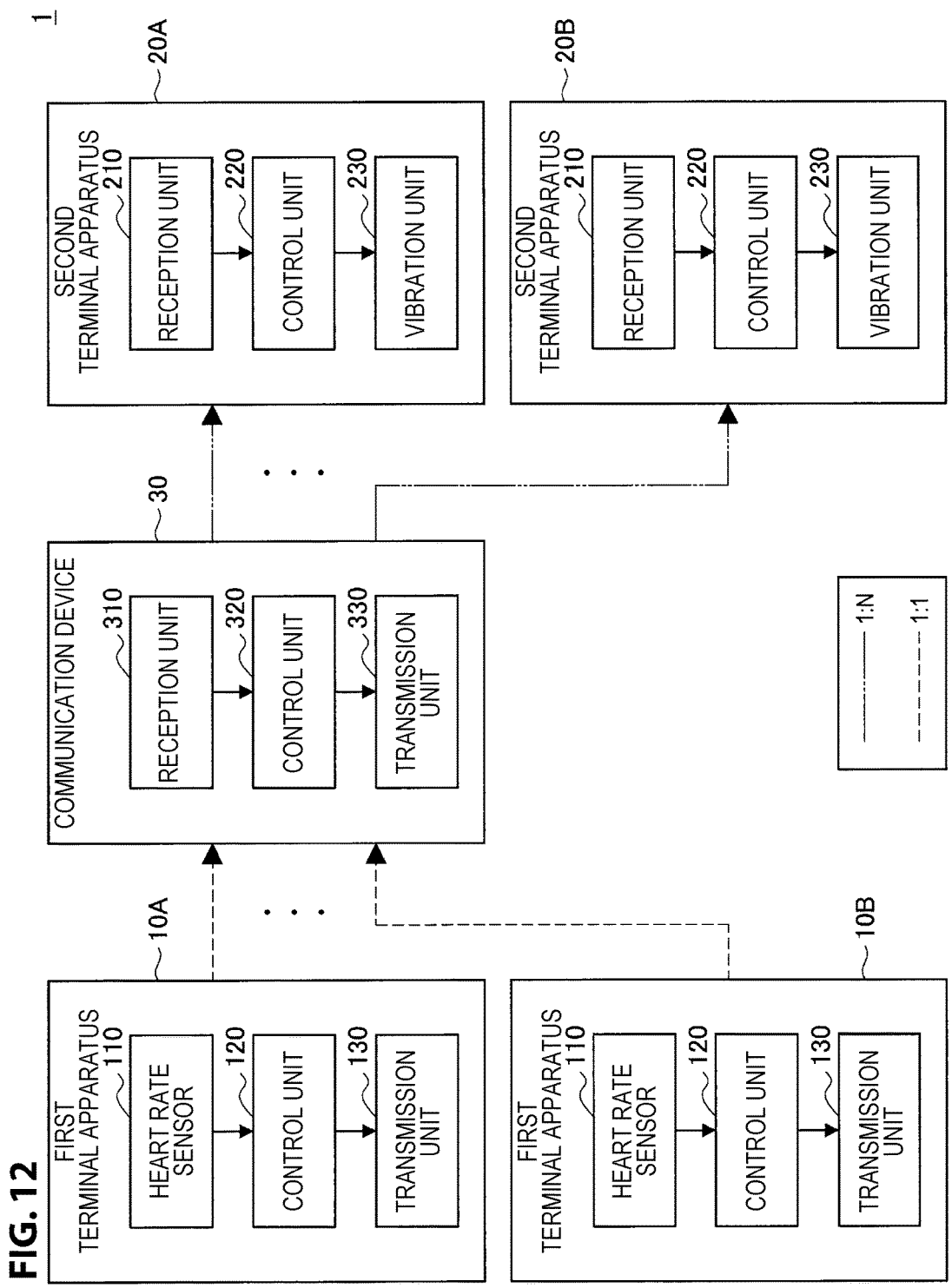
FIG. 12 is a diagram illustrating an example of a configuration of a system according to a third example.

FIG. 12 is a diagram illustrating an example of a configuration of the system 1 according to a third example. As illustrated in FIG. 12, the system 1 includes the plurality of first terminal apparatuses 10 (10A and 10B), the communication device 30, and the plurality of second terminal apparatuses 20. In the example, input entities 40 and generation entities 50 are mapped in the first terminal apparatuses 10, a distribution entity 60 is mapped in the communication device 30, and output entities 70 are mapped in the second terminal apparatuses 20. Each of the plurality of first terminal apparatuses 10 detects sensor information related to first users who are wearing the respective first terminal apparatuses 10, generate distribution information, and transmit the distribution information to the communication device 30. The communication device 30 performs distribution control and distributes the distribution information to the plurality of second terminal apparatuses 20. The second terminal apparatuses 20 receive and output the distribution information. Note that first users are users as distribution sources while second users are users as distribution destinations.

Internal configurations of the first terminal apparatuses 10, the second terminal apparatuses 20, and the communication device 30 are similar to those in the second example. The first terminal apparatuses 10 generate the distribution information and transmit the distribution information to the communication device 30. The communication device 30 transmits the distribution information received from the first terminal apparatuses 10 to the plurality of second terminal apparatuses 20. The second terminal apparatuses 20 output the distribution information received from the communication device 30.

However, the second terminal apparatus 20 may select from which of the first terminal apparatuses 10 the distribution information is to be output. Specifically, the second terminal apparatus 20 may select one piece of distribution information to be received from among a plurality of pieces of distribution information. In this case, the communication device 30 broadcasts a plurality of pieces of distribution information related to a plurality of first users, which have been received from the plurality of first terminal apparatuses, to the plurality of second terminal apparatuses 20, and the second terminal apparatuses 20 selectively receive and output the selected distribution information. In a case in which a plurality of pieces of distribution information are transmitted through respectively different wireless resources such as channels or frequencies, for example, the selective reception is realized by selecting a wireless resource for the reception. Since the amount of communication is suppressed by such selective reception, it is possible to suppress power consumption of the second terminal apparatuses 20. Note that the second users, for example, select which of the pieces of distribution information is to be received. Alternatively, the second terminal apparatuses 20 may select one piece of distribution information to be output from among the plurality of pieces of received distribution information while receiving the distribution information from the plurality of first terminal apparatuses 10 in parallel. In this case, the communication device 30 broadcasts, to the plurality of second terminal apparatuses 20, the plurality of pieces of distribution information related to the plurality of first users, which have been received from the plurality of first terminal apparatuses 10, and the second terminal apparatuses 20 outputs distribution information selected from among the plurality of pieces of received distribution information. According to such selective output, the second users can make flexible selection, such as selectin of a piece of desired distribution information, while causing a plurality of pieces of distribution information to be output, for example. Note that the selection about which of the pieces of distribution information is to be output is made by the second users, for example.

In addition, the selection of which of the pieces of distribution information the second terminal apparatuses 20 are caused to output may be made on the side of the distribution source (for example, the communication device 30). Specifically, the communication device 30 transmits one piece of distribution information selected from among the plurality of pieces of distribution information related to the plurality of first users to the plurality of second terminal apparatuses 20. In this manner, since it is only necessary for the second terminal apparatuses 20 to receive and output one piece of distribution information, and the amount of communication is suppressed, it is possible to suppress power consumption. In addition, it is possible to select and distribute distribution information of an artist, who plays solo performance/solo singing or the like, to whom the side of the distribution source desires to attract attention, from among a plurality of artists in live music performance on the side of the distribution source, for example. In this manner, it is possible to improve a degree of satisfaction of the distribution service.

Here, communication between the plurality of first terminal apparatuses 10 and the communication device 30 is one-to-one communication between each of the first terminal apparatuses 10 and the communication device 30. For example, wireless communication standards with no broadcasting mechanism, such as Bluetooth, may be used for the wireless communication path between the first terminal apparatuses 10 and the communication device 30. In that case, the communication device 30 has a plurality of receivers for reception from the plurality of first terminal apparatuses 10. It is a matter of course that wireless communication standards that are multiplexable, such as time-division multiplexable, like Wi-Fi or the like may be used for the wireless communication path between the first terminal apparatuses 10 and the communication device 30, and in that case, the communication device 30 may have one receiver. In addition, the system 1 may include the same number of communication devices 30 as the number of the first terminal apparatuses 10, and one-to-one communication may be performed between each of the first terminal apparatuses 10 and the communication device 30 as in the second example. In this case, each communication device 30 receives distribution information from one first terminal apparatus 10 and distributes distribution information to the plurality of second terminal apparatuses 20.

In addition, the wireless communication between the communication device 30 and the second terminal apparatuses 20 is one-to-N communication. That is, the same distribution information is transmitted (that is, broadcasted) from the communication device 30 to the plurality of second terminal apparatuses 20.

The example can be applied to live music performance, for example. In this case, a plurality of artists such as an idol group are first users while large audiences are second users.

The first terminal apparatuses 10 can also be driven by small-sized batteries, and the communication device 30 can be driven by an external power source such as an AC power source in the example in a manner similar to that in the second example.

The communication device 30 may perform different processing in accordance with whether or not a real time property is required in a manner similar to that in the second example.

3.4. Fourth Example

This example is an example in which a system 1 includes a first terminal apparatus 10, a communication device 30, and a plurality of second terminal apparatuses 20 (20A and 20B) and bidirectional distribution is performed. Hereinafter, the embodiment will be described with reference to FIG. 13.

Figure 13:
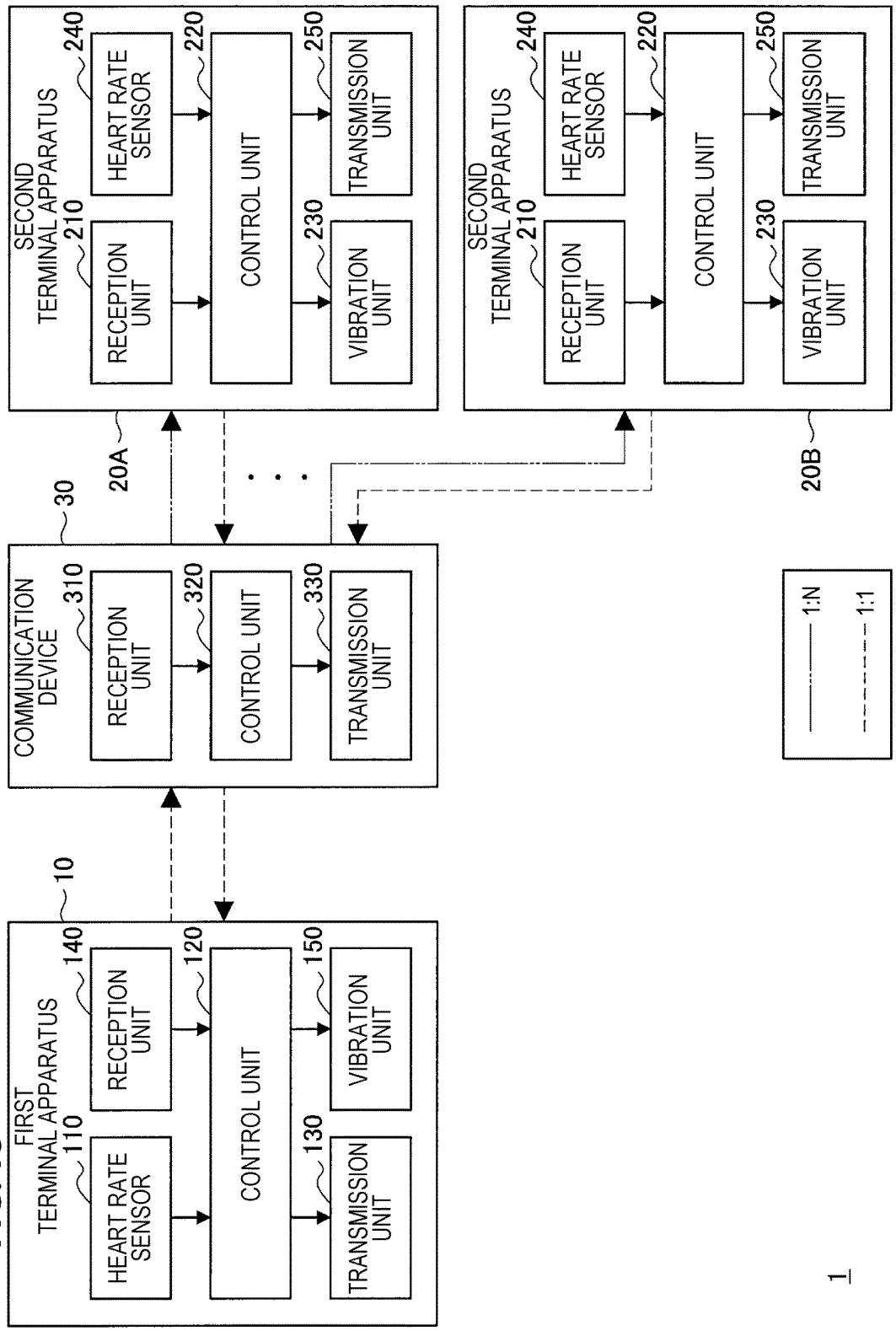
FIG. 13 is a diagram illustrating an example of a configuration of a system according to a fourth example.

FIG. 13 is a diagram illustrating an example of a configuration of the system 1 according to the fourth example. As illustrated in FIG. 13, the system 1 includes the first terminal apparatus 10, the communication device 30, and the plurality of second terminal apparatuses 20. In the example, input entities 40, generation entities 50, and output entities 70 are mapped in the first terminal apparatus 10 and the second terminal apparatuses 20, and a distribution entity 60 is mapped in the communication device 30. Bidirectional distribution is performed in the example.

First, distribution in a first direction from the first terminal apparatus 10 to the second terminal apparatuses 20 will be described. Distribution information transmitted in the first direction, that is, generated by the first terminal apparatus 10 will also be referred to as first distribution information. The first terminal apparatus 10 detects sensor information related to a first user, generates the first distribution information, and transmits the first distribution information to the communication device 30. The communication device 30 performs distribution control and distributes the first distribution information to the plurality of second terminal apparatuses 20. The second terminal apparatuses 20 receive and output the first distribution information. In the first direction, the first user is a user who is a distribution source while second users are users as distribution destinations.

Next, distribution in a second direction form the second terminal apparatuses 20 to the first terminal apparatus 10 will be described. Distribution information transmitted in the second direction, that is, generated by the second terminal apparatuses 20 will also be referred to as second distribution information. The second terminal apparatuses 20 detect sensor information related to the second users, generate the second distribution information, and transmit the second distribution information to the communication device 30. The communication device 30 performs distribution control and distributes the second distribution information to the first terminal apparatus 10. The first terminal apparatus 10 receives and outputs the second distribution information. In the second direction, the second users are users as the distribution sources while the first user is a user who is the distribution destination.

As illustrated in FIG. 13, the first terminal apparatus 10 includes a heart rate sensor 110, a control unit 120, a transmission unit 130, a reception unit 140, and a vibration unit 150. The heart rate sensor 110 is a sensor device that detects heart rate information. The control unit 120 generates the first distribution information on the basis of the detected heart rate information. It is a matter of course that the aforementioned generation processing such as abstraction or combination may be performed although the description thereof is omitted in the example. The transmission unit 130 transmits the first distribution information generated by the control unit 120 to the communication device 30. In addition, the reception unit 140 receives the second distribution information from the communication device 30. The control unit 120 performs output control based on the second distribution information received by the reception unit 140. The vibration unit 150 outputs tactile information in the second distribution information under control performed by the control unit 120.

As illustrated in FIG. 13, the communication device 30 includes a reception unit 310, a control unit 320, and a transmission unit 330. The reception unit 310 receives the first distribution information from the first terminal apparatus 10 and receives the second distribution information from the second terminal apparatuses 20.

The control unit 220 performs distribution control of the first distribution information and the second distribution information received by the reception unit 210. The transmission unit 330 distributes the first distribution information to the plurality of second terminal apparatuses 20 and distributes the second distribution information to the first terminal apparatus 10 under control performed by the control unit 220.

As illustrated in FIG. 13, each second terminal apparatus 20 includes a reception unit 210, a control unit 220, a vibration unit 230, a heart rate sensor 240, and a transmission unit 250. The reception unit 210 receives the first distribution information from the communication device 30. The control unit 220 performs output control based on the first distribution information received by the reception unit 210. The vibration unit 230 outputs tactile information in the first distribution information under control performed by the control unit 220. In addition, the heart rate sensor 240 is a sensor device that detects heart rate information. The control unit 220 generates the second distribution information on the basis of the detected heart rate information. It is a matter of course that the aforementioned generation processing such as abstraction or combination may be performed although the description thereof is omitted in the example. The transmission unit 250 transmits the second distribution information generated by the control unit 220 to the communication device 30.

Communication between the first terminal apparatus 10 and the communication device 30 in the first direction is similar to that in the second example. In addition, communication between the communication device 30 and the second terminal apparatuses 20 in the first direction is similar to that in the second example.

Communication between the second terminal apparatuses 20 and the communication device 30 in the second direction is similar to the communication between the first terminal apparatuses 10 and the communication device 30 in the third example. In addition, communication between the communication device 30 and the first terminal apparatus 10 in the second direction is one-to-one communication. For example, wireless communication standards with no broadcasting mechanism, such as Bluetooth, may be used for the wireless communication path between the communication device 30 and the first terminal apparatus 10.

The example is applied to live music performance, for example. In this case, one artist is a first user, and large audiences are second users. For example, tactile information based on a heart rate of the artist is provided to the audiences, and tactile information based on heart rates of the plurality of audiences is merged and provided to the artist. Merging processing can be realized by distribution information based on an average value of the heart rates of the plurality of audiences being generated in real time, for example. Alternatively, if the audiences shake their arms or clap their hands with the second terminal apparatuses 20 worn thereon, distribution information generated on the basis of the information thereof is provided to the artist. Note that the second terminal apparatuses 20 include at least acceleration sensors in this case. It is possible for the artist and the audiences to mutually provide a sense of unity by such bidirectional distribution.

The first terminal apparatus 10 can also be driven by a small-sized batter, and the communication device 30 can be driven by an external power source such as an AC power source in the example in a manner similar to that in the second example.

The communication device 30 may perform different processing in accordance with whether or not a real time property is required in a manner similar to that in the second example.

3.5. Fifth

This example is an example in which a system 1 includes a plurality of first terminal apparatuses 10 (10A and 10B), a communication device 30, and a plurality of second terminal apparatuses 20 (20A and 20B) and bidirectional distribution is performed. Hereinafter, the example will be described with reference to FIG. 14.

Figure 14:
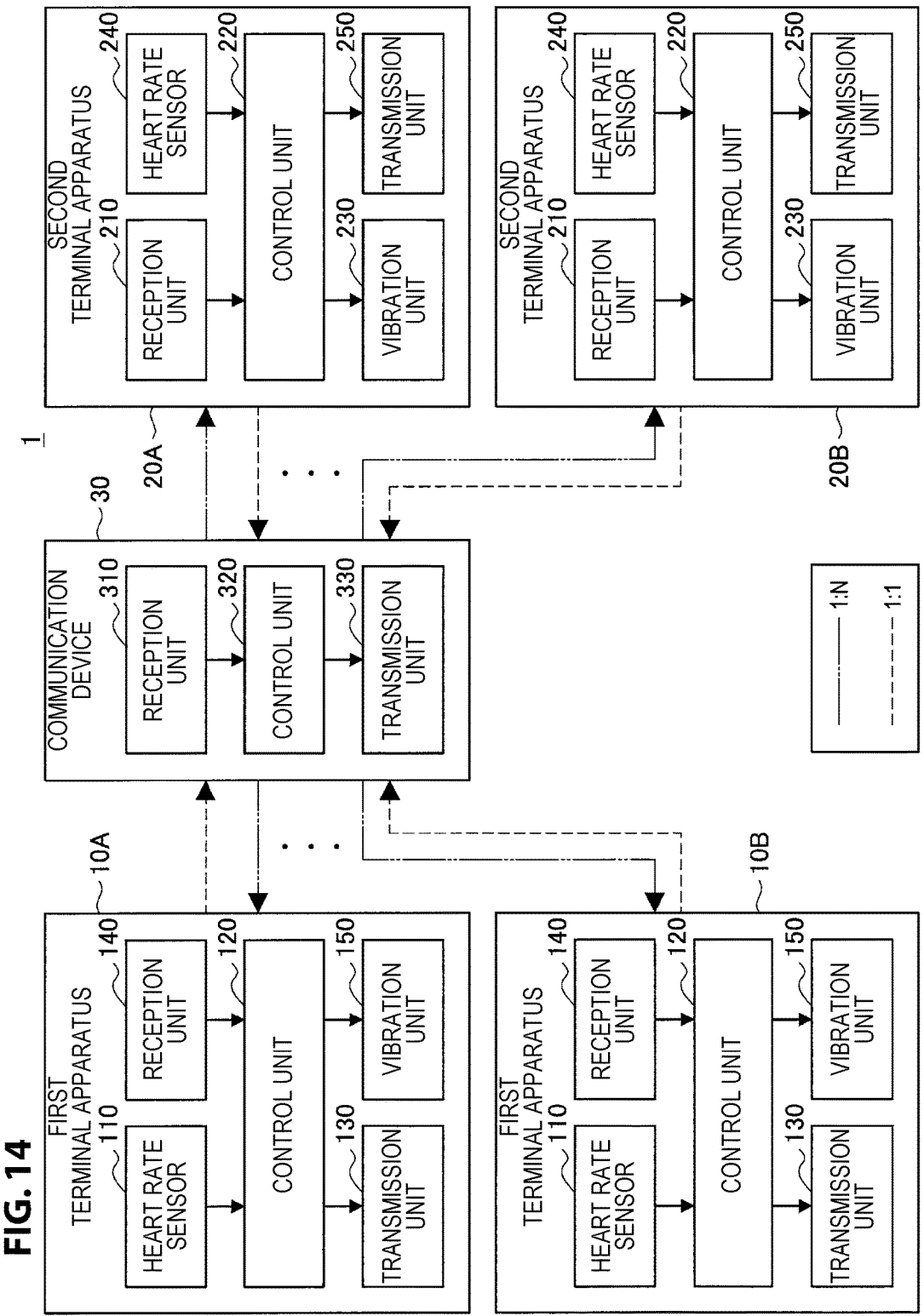
FIG. 14 is a diagram illustrating an example of a configuration of a system according to a fifth example.

FIG. 14 is a diagram illustrating an example of a configuration of the system 1 according to a fifth example. As illustrated in FIG. 14, the system 1 includes the plurality of first terminal apparatuses 10, the communication device 30, and the plurality of second terminal apparatuses 20. In the example, input entities 40, generation entities 50, and output entities 70 are mapped in the first terminal apparatuses 10 and the second terminal apparatuses 20, and a distribution entity 60 is mapped in the communication device 30. In the example, bidirectional distribution is performed in a manner similar to that in the fourth example.

Internal configurations of the first terminal apparatuses 10, the second terminal apparatuses 20, and the communication device 30 are similar to those in the fourth example.

Communication between the first terminal apparatuses 10 and the communication device 30 in the first direction is similar to that in the third example. In addition, communication between the communication device 30 and the second terminal apparatuses 20 in the first direction is similar to that in the third example.

Communication between the second terminal apparatuses 20 and the communication device 30 in the second direction is similar to the communication between the first terminal apparatuses 10 and the communication device 30 in the third example. In addition, communication between the communication device 30 and the first terminal apparatuses 10 in the second direction is similar to the communication between the communication device 30 and the second terminal apparatuses 20 in the third example.

The example is applied to live music performance, for example. In this case, a plurality of artists such as an idol group are first users while large audiences are second users. For example, tactile information based on heart rates of the plurality of artists is provided to the audience after being merged or individually (that is, by being chosen without being merged), tactile information based on heart rates of the plurality of audiences is merged and provided to the artists. In another case, if the audiences shake their arms of clap their hands with the second terminal apparatuses 20 worn thereon, for example, distribution information generated on the basis of the information thereof is provided to the artists. Note that the second terminal apparatuses 20 include at least acceleration sensors in this case. It is possible for the plurality of artists and the audiences to share a sense of unity with each other by such bidirectional distribution.

The first terminal apparatuses 10 can also be driven by small-sized batteries, and the communication device 30 can be driven by an external power source such as an AC power source in the example in a manner similar to that in the second example.

The communication device 30 may perform different processing in accordance with whether or not a real time property is required in a manner similar to that in the second example.

4. EXAMPLE OF HARDWARE CONFIGURATION

Figure 15:
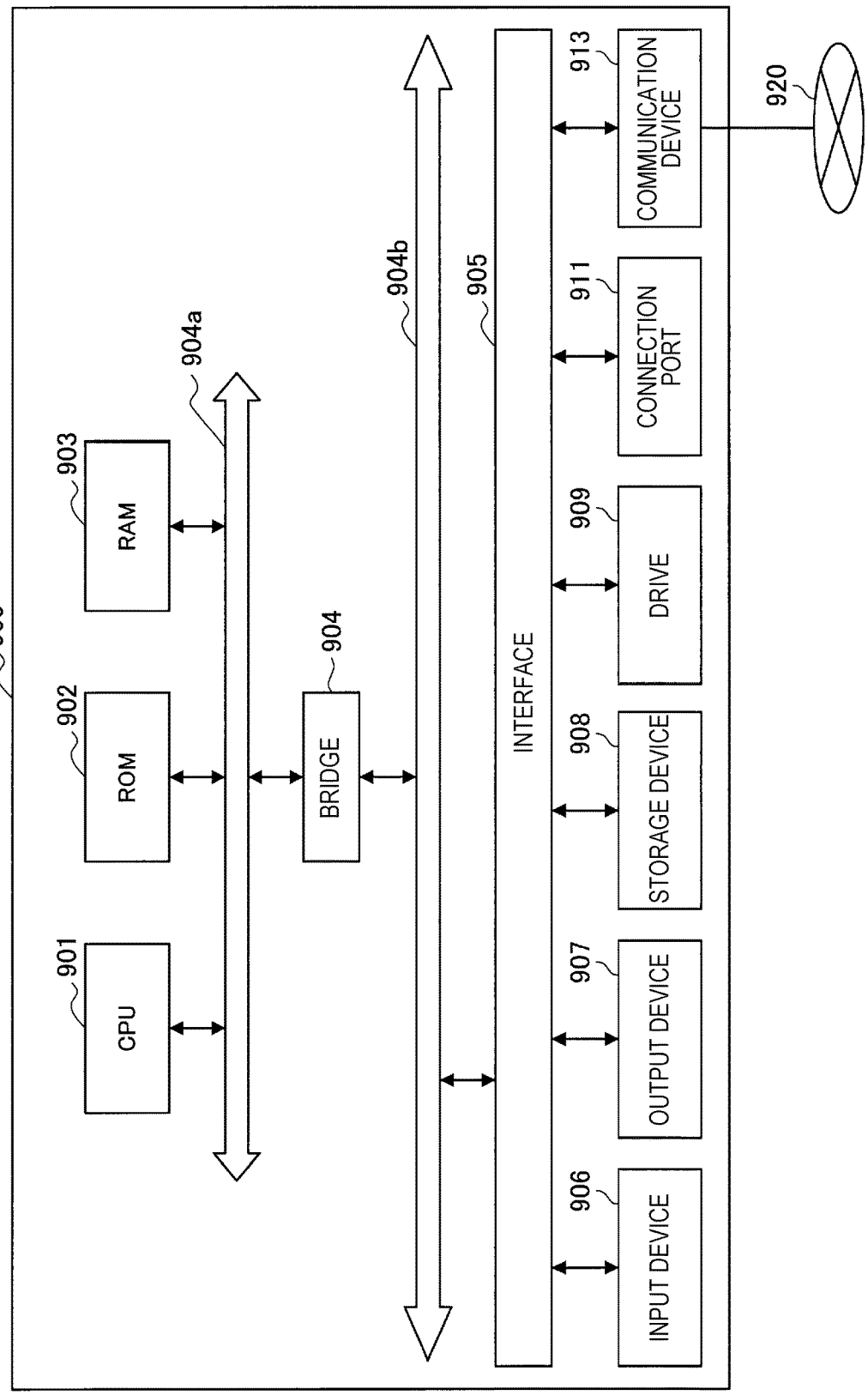
FIG. 15 is a block diagram illustrating an example of a hardware configuration of an information processing apparatus according to the embodiment.

Finally, a hardware configuration of an information processing apparatus according to the embodiments will be described with reference to FIG. 15. FIG. 15 is a block diagram illustrating an example of the hardware configuration of the information processing apparatus according to the embodiment. Note that an information processing apparatus 900 illustrated in FIG. 15 can realize the first terminal apparatus 10, the second terminal apparatus 20, or the communication device 30 described above with reference to FIGS. 9 to 14, for example. In other words, at least any of the input entity 40, the generation entity 50, the distribution entity 60, and the output entity 70 described above with reference to FIG. 5, for example, can be mapped in the information processing apparatus 900 illustrated in FIG. 15. Information processing performed by the first terminal apparatus 10, the second terminal apparatus 20, or the communication device 30 (in other words, the input entity 40, the generation entity 50, the distribution entity 60, or the output entity 70) according to the embodiments is realized by cooperation between software and hardware, which will be described later.

As illustrated in FIG. 15, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as an electric circuit, a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. A physical entity in which at least any of the input entity 40, the generation entity 50, the distribution entity 60, or the output entity 70 illustrated in FIG. 5 is mapped includes the CPU 901. In detail, the CPU 901 can form the control unit 120, the control unit 220, or the control unit 320 illustrated in FIGS. 9 to 14. For example, the CPU 901 controls the information processing apparatus 900 to detect sensor information, generate distribution information on the basis of the sensor information, control distribution of the distribution information, and output the distribution information.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in one bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The physical entity in which the input entity 40 illustrated in FIG. 5 is mapped includes the input device 906. In detail, the input device 906 can form a sensor device included in the first terminal apparatus 10 or the second terminal apparatus 20 illustrated in FIGS. 9 to 14. Although FIGS. 9 to 14 illustrates the heart rate sensor 110, the electronic musical instrument 160, the microphone 170, and the heart rate sensor 240 as examples of the sensor device, the first terminal apparatus 10 and the second terminal apparatus 20 may include the aforementioned arbitrary input device 906 in addition to these devices, and the distribution information may be generated on the basis of a variety of detected sensor information.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. In addition, the output device 907 may be formed by a device capable of outputting information to the user via tactile sensation, such as a vibration actuator, a voice coil actuator, an eccentric motor, a low-frequency wave generation device, or a force sense presenting device. The physical entity in which the output entity 70 illustrated in FIG. 5 is mapped includes the output device 907. In detail, the output device 907 can form an output device included in the first terminal apparatus 10 or the second terminal apparatus 20 illustrated in FIGS. 9 to 14. Although the vibration unit 150, the vibration unit 230, and the light emitting unit 260 are illustrated as examples of the output device in FIGS. 9 to 14, the first terminal apparatus 10 and the second terminal apparatus 20 may include the aforementioned arbitrary output device 907 in addition to the vibration unit 150, the vibration unit 230, and the light emitting unit 260 and may output distribution information by a variety of means.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The physical entity in which the distribution entity 60 illustrated in FIG. 5 is mapped includes the storage device 908. In detail, the storage device 908 can be included in the communication device 30 illustrated in FIGS. 11 to 14. For example, the communication device 30 includes the storage device 908 and temporarily accumulates distribution information.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The physical entity in which at least any of the input entity 40, the generation entity 50, the distribution entity 60, and the output entity 70 illustrated in FIG. 5 is mapped includes the communication device 913. In detail, the communication device 913 can form the transmission unit 130, the reception unit 140, the reception unit 210, the transmission unit 250, the reception unit 310, or the transmission unit 330 illustrated in FIGS. 9 to 14.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

5. CONCLUSION

The embodiments of the present disclosure have been described in detail with reference to FIGS. 1 to 15. As described above, the system 1 according to the embodiment includes at least the first terminal apparatus 10 and the plurality of second terminal apparatuses 20, the first terminal apparatus 10 transmits the tactile information generated by combining the sensor information related to the first user, and the second terminal apparatuses 20 receive and output the tactile information. Since the tactile information is generated by the plurality of pieces of sensor information being combined, the information amount of the tactile information becomes richer as compared with a case in which tactile information is generated on the basis of a single piece of sensor information. In this manner, it is possible to perform rich communication by using tactile stimulation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the above description has been given on the assumption that at least the second terminal apparatuses 20 are wrist watch-type or wrist band-type wearable terminals that are worn on the wrists of the users, for example, the present technology is not limited to such an example. For example, the second terminal apparatuses 20 may be realized by other wearable terminals of a pendant type, a glasses-type, or the like or may be realized as terminals that the users bring with them, such as smartphones. In addition, functions of the second terminal apparatuses 20 may be realized by an application (that is, a program) and may be downloaded in wearable terminals such as smart watches. In addition, the second terminal apparatuses 20 may be realized as cheering goods such as pen lights or paper fans that are used by audiences in live music concert halls. In addition, the second terminal apparatuses 20 may be realized as cheering goods, such as megaphones, that are used by audiences in sports watching sites.

Note that it is not necessary for the processing described in this specification with reference to the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A system including:

a first terminal apparatus; and a plurality of second terminal apparatuses, in which the first terminal apparatus transmits first tactile information that has been generated by combining first sensor information related to a first user detected by sensors and indicates a state of the first user, and the plurality of second terminal apparatuses receive and output the first tactile information.

(2)

The system according to (1), in which the first tactile information is tactile information that has been generated by modulating sensor information detected in relation to the first user on a basis of other detected sensor information.

(3)

The system according to (2), in which the first tactile information is vibration information obtained by modulating vibration information based on a heart rate of the first user on a basis of body temperature information of the first user.

(4)

The system according to (2), in which the first tactile information is vibration information obtained by modulating vibration information based on an action of the first user on a basis of sound information in a surrounding of the first user.

(5)

The system according to any one of (1) to (4), in which the first terminal apparatus controls whether or not to transmit the first tactile information on a basis of the state of the first user.

(6)

The system according to any one of (1) to (5), in which the first tactile information is generated using a generation rule corresponding to the state of the first user from among a plurality of the generation rules for the first tactile information.

(7)

The system according to any one of (1) to (6), in which the first tactile information is information obtained by abstracting the state of the first user in accordance with a set level.

(8)

The system according to any one of (1) to (7), further including:

a plurality of the first terminal apparatuses; and a communication device that transmits the first tactile information received from the first terminal apparatuses to the plurality of second terminal apparatuses;

in which the communication device transmits a plurality of pieces of the first tactile information related to a plurality of the first users to the plurality of second terminal apparatuses, and the second terminal apparatuses select one piece of the first tactile information to be output from among the plurality of received pieces of first tactile information.

(9)

The system according to any one of (1) to (7), further including:

a plurality of the first terminal apparatuses; and a communication device that transmits the first tactile information received from the first terminal apparatuses to the plurality of second terminal apparatuses, in which the communication device transmits a plurality of pieces of the first tactile information related to a plurality of the first users to the plurality of second terminal apparatuses, and the second terminal apparatuses select one piece of the first tactile information to be received from among the plurality of pieces of first tactile information.

(10)

The system according to any one of (1) to (7), further including:

a plurality of the first terminal apparatuses; and a communication device that transmits the first tactile information received from the first terminal apparatuses to the plurality of second terminal apparatuses, in which the communication device transmits one piece of the first tactile information selected from among a plurality of pieces of the first tactile information related to a plurality of the first users to the plurality of second terminal apparatuses.

(11)

The system according to any one of (1) to (10), in which the second terminal apparatuses transmit second tactile information that has been generated by combining second sensor information related to a second user detected by sensors and indicates state of the second user, and the first terminal apparatus receives and outputs the second tactile information.

(12)

The system according to (11), further including:

a plurality of the first terminal apparatuses; and a communication device that transmits the second tactile information related to the second user, which has been received from the second terminal apparatuses, to the plurality of first terminal apparatuses.

(13)

The system according to any one of (1) to (12), in which the first tactile information is transmitted to the second terminal apparatuses via a wireless communication path.

(14)

The system according to (13), in which the first tactile information is differently generated in accordance with the wireless communication path used to transmit the first tactile information to the second terminal apparatuses.

(15)

The system according to any one of (1) to (14), in which the second terminal apparatuses output the first tactile information in a case in which a second user associated with the second terminal apparatuses has conducted a predetermined action.

(16)

The system according to any one of (1) to (15), in which the second terminal apparatuses are worn by a second user other than the first user.

(17)

A terminal apparatus including:

a control unit that transmits first tactile information that has been generated by combining first sensor information related to a first user detected by sensors and indicates a state of the first user.

(18)

A terminal apparatus including:

a control unit that receives and outputs first tactile information that has been generated by combining a plurality of pieces of first sensor information related to a first user detected by sensors and indicates a state of the first user.

(19)

A method performed in a system including a first terminal apparatus and a plurality of second terminal apparatuses, the method including:

by the first terminal apparatus, transmitting first tactile information that has been generated by combining first sensor information related to a first user detected by sensors and indicates a state of the first user; and by the plurality of second terminal apparatuses, receiving and outputting the first tactile information.

(20)

A recording medium having a program recorded thereon, the program causing a computer to function as:

a control unit that receives and outputs first tactile information that has been generated by combining a plurality of pieces of first sensor information related to a first user detected by sensors and indicates a state of the first user.

REFERENCE SIGNS LIST

1 system
10 first terminal apparatus
110 heart rate sensor
120 control unit
130 transmission unit 140 reception unit
150 vibration unit
160 electronic musical instrument
170 microphone
second terminal apparatus
210 reception unit
220 control unit
230 vibration unit
240 heart rate sensor
250 transmission unit
260 light emitting unit
30 communication device
310 reception unit
320 control unit
330 transmission unit
21 light emitting unit
22 vibration unit
23 band unit
24 shape maintaining unit
25 magnet
26 wearable terminal
27 attachment
40 input entity
50 generation entity
60 distribution entity
70 output entity

The invention claimed is:

1. A system comprising:
a first terminal apparatus; and
a plurality of second terminal apparatuses,
wherein the first terminal apparatus transmits first tactile information that has been generated by combining first sensor information related to a first user detected by sensors and indicates a state of the first user, and
the plurality of second terminal apparatuses receive and output the first tactile information,
wherein the first tactile information includes tactile information that has been generated by modulating sensor information detected in relation to the first user based on another sensor information detected in relation to the first user.

2. The system according to claim 1, wherein the first tactile information includes vibration information obtained by modulating vibration information based on a heart rate of the first user on a basis of body temperature information of the first user.

3. The system according to claim 1, wherein the first tactile information includes vibration information obtained by modulating vibration information based on an action of the first user on a basis of sound information in a surrounding of the first user.

4. The system according to claim 1, wherein the first terminal apparatus controls whether or not to transmit the first tactile information on a basis of the state of the first user.

5. The system according to claim 1, wherein the first tactile information is generated using a generation rule corresponding to the state of the first user from among a plurality of the generation rules for the first tactile information.

6. The system according to claim 1, wherein the first tactile information includes information obtained by abstracting the state of the first user in accordance with a set level.

7. The system according to claim 1, further comprising:
another first terminal apparatus; and
a communication device that transmits the first tactile information received from the first terminal apparatuses to the plurality of second terminal apparatuses,
wherein the communication device transmits a plurality of pieces of the first tactile information related to a plurality of the first users to the plurality of second terminal apparatuses, and
the plurality of second terminal apparatuses select one piece of the first tactile information to be output from among the plurality of received pieces of the first tactile information.

8. The system according to claim 1, further comprising:
another first terminal apparatus; and
a communication device that transmits the first tactile information received from the first terminal apparatuses to the plurality of second terminal apparatuses,
wherein the communication device transmits a plurality of pieces of the first tactile information related to a plurality of the first users to the plurality of second terminal apparatuses, and
the plurality of second terminal apparatuses select one piece of the first tactile information to be received from among the plurality of pieces of the first tactile information.

9. The system according to claim 1, further comprising:
another first terminal apparatus; and
a communication device that transmits the first tactile information received from the first terminal apparatuses to the plurality of second terminal apparatuses,
wherein the communication device transmits one piece of the first tactile information selected from among a plurality of pieces of the first tactile information related to a plurality of the first users to the plurality of second terminal apparatuses.

10. The system according to claim 1,
wherein the plurality of second terminal apparatuses transmit second tactile information that has been generated by combining second sensor information related to a second user detected by sensors and indicates state of the second user, and
the first terminal apparatus receives and outputs the second tactile information.

11. The system according to claim 10, further comprising:
another first terminal apparatus; and
a communication device that transmits the second tactile information related to the second user, which has been received from the plurality of second terminal apparatuses, to the first terminal apparatuses.

12. The system according to claim 1, wherein the first tactile information is transmitted to the plurality of second terminal apparatuses via a wireless communication path.

13. The system according to claim 12, wherein the first tactile information is differently generated in accordance with the wireless communication path used to transmit the first tactile information to the plurality of second terminal apparatuses.

14. The system according to claim 1, wherein the plurality of second terminal apparatuses output the first tactile information in a case in which a second user associated with the plurality of second terminal apparatuses has conducted a predetermined action.

15. The system according to claim 1, wherein the plurality of second terminal apparatuses are worn by a second user other than the first user.

16. A terminal apparatus comprising:

a control unit that transmits first tactile information that has been generated by combining first sensor information related to a first user detected by sensors and indicates a state of the first user, wherein the first tactile information includes tactile information that has been generated by modulating sensor information detected in relation to the first user based on another sensor information detected in relation to the first user, and wherein the control unit is implemented via at least one processor.

17. A terminal apparatus comprising:

a control unit that receives and outputs first tactile information that has been generated by combining a plurality of pieces of first sensor information related to a first user detected by sensors and indicates a state of the first user, wherein the first tactile information includes tactile information that has been generated by modulating sensor information detected in relation to the first user based on another sensor information detected in relation to the first user, and wherein the control unit is implemented via at least one processor.

18. A method performed in a system including a first terminal apparatus and a plurality of second terminal apparatuses, the method comprising:

transmitting, by the first terminal apparatus, first tactile information that has been generated by combining first sensor information related to a first user detected by sensors and indicates a state of the first user; and receiving and outputting, by the plurality of second terminal apparatuses, the first tactile information, wherein the first tactile information includes tactile information that has been generated by modulating sensor information detected in relation to the first user based on another sensor information detected in relation to the first user.

19. A non-transitory computer-readable recording medium having embodied thereon a program, which when executed by a computer causes the computer to execute a method, the method comprising:

receiving and outputting first tactile information that has been generated by combining a plurality of pieces of first sensor information related to a first user detected by sensors and indicates a state of the first user, wherein the first tactile information includes tactile information that has been generated by modulating sensor information detected in relation to the first user based on another sensor information detected in relation to the first user.

* * * * *